US012678893B2

(12) United States Patent
Setoguchi et al.

(10) Patent No.: US 12,678,893 B2
(45) Date of Patent: Jul. 14, 2026

(54) SKID STATE DETERMINATION DEVICE, SKID STATE DETERMINATION METHOD, AND LASER PROCESSING SYSTEM

(71) Applicant: AMADA CO., LTD., Kanagawa (JP)

(72) Inventors: Jun Setoguchi, Kanagawa (JP); Masato Takatsu, Kanagawa (JP); Hiroaki Ishiguro, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 939 days.

(21) Appl. No.: 17/919,966

(22) PCT Filed: Apr. 20, 2021

(86) PCT No.: PCT/JP2021/015996
§ 371 (c)(1),
(2) Date: Oct. 19, 2022

(87) PCT Pub. No.: WO2021/215429
PCT Pub. Date: Oct. 28, 2021

(65) Prior Publication Data
US 2023/0166354 A1 Jun. 1, 2023

(30) Foreign Application Priority Data

Apr. 23, 2020 (JP) ................................. 2020-076623

(51) Int. Cl.
*B23K 26/08* (2014.01)
*B23K 26/10* (2006.01)
(Continued)

(52) U.S. Cl.
CPC .......... *B23K 26/0876* (2013.01); *B23K 26/10* (2013.01); *B23K 26/38* (2013.01); *B23K 37/04* (2013.01); *B23Q 17/249* (2013.01)

(58) Field of Classification Search
CPC .... B08B 1/10; B08B 1/30; B08B 1/34; B08B 1/20
(Continued)

(56) References Cited

U.S. PATENT DOCUMENTS 5,304,773 A * 4/1994 Kilian ................ B23K 26/0853
219/121.78
6,127,648 A * 10/2000 Scott ...................... B23K 26/16
83/167
(Continued)

FOREIGN PATENT DOCUMENTS

DE 102017210182 A1 12/2018
DE 102020107256 A1 * 9/2021 ......... G01B 11/2518

OTHER PUBLICATIONS

Extended European Search Report for corresponding EP Application No. 21792528.8 dated May 7, 2024.
(Continued)

*Primary Examiner* — Isiaka O Akanbi
(74) *Attorney, Agent, or Firm* — Renner, Otto, Boisselle & Sklar, LLP

(57) ABSTRACT

A skid state determination device is a skid state determination device for determining a state of a plurality of skids for supporting a workpiece to be processed by a laser processing machine, with a supporting surface formed by top points of a plurality of protrusions, and includes: imaging means configured to be able to image at least a part of a skid table provided with the plurality of skids; and state determination means configured to determine the state of the skids based on image information obtained by imaging the skid table with the imaging means, and the state determination means executes: first determination processing for determining the state of the skids based on the image information obtained by imaging the skid table with the imaging means, before the workpiece is carried onto the skid table; and second deter-
(Continued)

mination processing for determining the state of the skids based on the image information obtained by imaging the skid table with the imaging means, after the workpiece is carried out from the laser processing machine but before a product obtained by processing the workpiece is carried out from the skid table.

13 Claims, 11 Drawing Sheets

(51) Int. Cl.
| | |
|---|---|
| *B23K 26/38* | (2014.01) |
| *B23K 37/04* | (2006.01) |
| *B23Q 17/24* | (2006.01) |

(58) Field of Classification Search
USPC ........................................... 356/237.1–237.6
See application file for complete search history.

(56) References Cited

U.S. PATENT DOCUMENTS

| | | | | |
|---|---|---|---|---|
| 6,437,286 | B1 * | 8/2002 | Scott .................... | B23K 26/706 |
| | | | | 219/121.82 |
| 6,455,803 | B1 * | 9/2002 | Fields, Jr. ............ | B23K 26/242 |
| | | | | 219/121.64 |
| 7,759,608 | B2 * | 7/2010 | LeMasson ......... | B23K 37/0461 |
| | | | | 219/121.68 |
| 2005/0269302 | A1 * | 12/2005 | Horn .................... | B23K 26/702 |
| | | | | 219/121.78 |
| 2008/0225067 | A1 * | 9/2008 | Morino ................. | B41J 29/393 |
| | | | | 347/14 |
| 2009/0057283 | A1 * | 3/2009 | Schmauder ........... | B23K 28/02 |
| | | | | 219/121.72 |
| 2009/0184097 | A1 * | 7/2009 | Klaiber .................... | B08B 1/10 |
| | | | | 134/6 |
| 2016/0256956 | A1 * | 9/2016 | Nagae .................... | B23K 26/38 |
| 2017/0115656 | A1 * | 4/2017 | Ottnad .............. | B23K 26/1464 |
| 2019/0031446 | A1 * | 1/2019 | Hognaland .............. | B08B 1/30 |
| 2019/0243343 | A1 * | 8/2019 | Kiefer ..................... | B23Q 7/12 |
| 2021/0138589 | A1 * | 5/2021 | Bader .............. | G05B 19/4061 |
| 2021/0229308 | A1 * | 7/2021 | Ottnad .................. | B23K 26/38 |
| 2022/0410307 | A1 * | 12/2022 | Jacobi .................. | B23K 37/08 |
| 2023/0001522 | A1 * | 1/2023 | Kiefer .................. | B23K 26/38 |
| 2023/0072691 | A1 * | 3/2023 | Conway ............... | B24B 29/005 |

OTHER PUBLICATIONS

International Search Report for corresponding Application No. PCT/JP2021/015996, mailed Jul. 20, 2021.

\* cited by examiner (a)

SKID STATE DETERMINATION DEVICE, SKID STATE DETERMINATION METHOD, AND LASER PROCESSING SYSTEM

TECHNICAL FIELD

The present invention relates to a skid state determination device, a skid state determination method, and a laser processing system for determining a skid state.

BACKGROUND ART

In laser processing, a skid table provided with a plurality of skids that planarly support a workpiece, which is a member to be processed, by contacting with a large number of points is used. The skids are workpiece support members and have a structure that enables forks of a forklift to enter and lift a workpiece. The skid table supporting the workpiece is mounted on a processing pallet, and the skid table is carried in and out from a laser processing machine together with this processing pallet. Known defects that occur in the skid table include, for example, deposition and welding of a metal melted residue such as a spatter to the skid due to laser processing, welding between a workpiece or a scrap and the skid, poor removal of a scrap, various processing defects resulting from damage to a skid due to a laser beam, and damage to a product or equipment are known.

In order to prevent the occurrence of such defects, a skid evaluation device for evaluating a state of skids is disclosed (see Patent Literature 1, for example). In this skid evaluation device, a detection device composed of a beam sensor and a line camera is used to detect the state of the skid in the lateral direction (longitudinal direction) of the skid and change in the thickness of the skid (lateral direction), and determine a difference between the detected actual state or thickness and a target value. Then, maintenance such as cleaning and replacement of the skid is performed in accordance with a determination result.

CITATION LIST

Patent Literature

Patent Literature 1: Specification of German Patent Application Laid-open Publication No. 102017210182

SUMMARY

Technical Problem

However, in the conventional technological skid evaluation device disclosed in the above Patent Literature 1, although the detection device can detect the state of each skid in the longitudinal direction and the change in thickness, the detection device has a problem in that because of the structure thereof, it is not possible to detect the spatter deposited or dross welded between a plurality of protrusions of the skid, or more detailed changes such as loss of the protrusions themselves, and welding between the protrusions and the workpiece. In a case where these small changes are recognized, it can never be said that the skid state is good. Therefore, probability that the above defects occur in the near future becomes extremely high.

For example, in a case of thick plate processing or processing of a large number of sheets, one process takes a long time and the skid state is thus sometimes greatly changed during processing even when it is confirmed that the skid state is good before laser processing is started in order to prevent the occurrence of defects as much as possible. In such a case, defects may be discovered only after processing. When a processed product continues to be carried out, a carrying-out mechanism may interfere with deposits, and the product itself is sometimes regarded as a defective product and wasted. When a forklift tries to take out the workpiece supported by the skids, a fork may not be able to enter the skids due to deposits, or the workpiece and the skids may be welded together, so that the workpiece cannot be taken out. Therefore, in laser processing, there is a growing need to identify and grasp the skid state more finely and precisely.

Solution to Problem

A skid state determination device according to the present invention is a skid state determination device for determining a state of a plurality of skids for supporting a workpiece to be processed by a laser processing machine, with a supporting surface formed by top points of a plurality of protrusions, and includes: imaging means configured to be able to image at least a part of a skid table provided with the plurality of skids; and state determination means configured to determine the state of the skids based on image information obtained by imaging the skid table with the imaging means, and the state determination means executes: first determination processing for determining the state of the skids based on the image information obtained by imaging the skid table with the imaging means, before the workpiece is carried onto the skid table; and second determination processing for determining the state of the skids based on the image information obtained by imaging the skid table with the imaging means, after the workpiece is carried out from the laser processing machine but before a product obtained by processing the workpiece is carried out from the skid table.

In an embodiment of the present invention, the imaging means is configured to image the skid table from a position above the supporting surface formed by the top points of the plurality of protrusions formed on the plurality of skids and output first image information, before the workpiece is carried onto the skid table, and is configured to image the skid table from a position below the supporting surface and output second image information, in a state in which a processed workpiece is supported by the skid table.

In another embodiment of the present invention, a backlight source configured to irradiate the skid table with a beam from a direction different from an imaging direction of the imaging means is further provided.

In yet another embodiment of the present invention, the state determination means is configured to store a reference image, compare an image in the image information and the reference image, and determine the state of the skids.

In yet another embodiment of the present invention, the state determination means is configured to extract outlines including the plurality of protrusions of the skids from the image information, compare the extracted outlines with a reference shape previously stored, and determine the state of the skids.

In yet another embodiment of the present invention, the state determination means is configured to extract outlines including the plurality of protrusions of the skids from the image information, determine pass lines connecting the top points of the plurality of protrusions, and determine the state of the skids based on the pass lines and the outlines.

In yet another embodiment of the present invention, the state determination means is configured to determine the state of the skids based on distances in the height directions of the skids between valley portions appearing around the protrusions of the outlines and the pass lines.

In yet another embodiment of the present invention, the state determination means is configured to determine the state of the skids based on areas of regions surrounded by the outlines and the pass lines.

In yet another embodiment of the present invention, the state determination means is configured to determine the state of the skids based on thicknesses of the skids based on the outlines.

In yet another embodiment of the present invention, notification means configured to notify a predetermined warning or alarm based on a determination result by the state determination means is further provided.

In yet another embodiment of the present invention, the state determination means further includes:

a learning unit having a learning model generated by learning relation between a plurality of pieces of the image information, and the state of the skids classified into a plurality of groups; and defect prediction means configured to determine the state of the skids based on the learning model, and determines necessity of a warning or an alarm, and a type of the warning or the alarm, as well as whether or not processing is to be continued, in accordance with the state of the skids, and the notification means has display means configured to visually display the warning or the alarm based on the determination result by the defect prediction means.

A laser processing system according to the present invention includes: a laser processing machine configured to process a workpiece with a laser beam; a skid table provided with a plurality of skids for supporting the workpiece with a supporting surface formed by top points of a plurality of protrusions; a processing pallet configured to be carried into and out from the laser processing machine together with the skid table and the workpiece; an imaging device configured to be able to image at least a part of the skid table on the processing pallet at a position of the processing pallet immediately before the processing pallet is carried into the laser processing machine and immediately after the processing pallet is carried out from the laser processing machine; and a state determination device configured to determine a state of the skids based on image information obtained by imaging the skid table with the imaging device, and the state determination device executes: first determination processing for determining the state of the skids based on the image information obtained by imaging the skid table with the imaging device, before the workpiece is carried onto the skid table; and second determination processing for determining the state of the skids based on the image information obtained by imaging the skid table with the imaging device, after the processing pallet is carried out from the laser processing machine but before a product obtained by processing the workpiece is carried out from the skid table.

In an embodiment of the present invention, the imaging device is configured to image the skid table from a position above the supporting surface formed by the top points of the plurality of protrusions formed on the plurality of skids and output first image information, before the workpiece is carried onto the skid table, and is configured to image the skid table from a position below the supporting surface and output second image information, in a state in which a processed workpiece is supported by the skid table.

In another embodiment of the present invention, a backlight source configured to irradiate the skid table with a beam from a direction different from an imaging direction of the imaging device is further provided.

In yet another embodiment of the present invention, the state determination device is configured to store a reference image, compare an image in the image information and the reference image, and determine the state of the skids.

In yet another embodiment of the present invention, the state determination device is configured to extract outlines including the plurality of protrusions of the skids from the image information, compare the extracted outlines with a reference shape previously stored, and determine the state of the skids.

In yet another embodiment of the present invention, the state determination device is configured to extract outlines including the plurality of protrusions of the skids from the image information, determine pass lines connecting the top points of the plurality of protrusions, and determine the state of the skids based on the pass lines and the outlines.

In yet another embodiment of the present invention, the state determination device is configured to determine the state of the skids based on distances in the height directions of the skids between valley portions appearing around the protrusions of the outlines and the pass lines.

In yet another embodiment of the present invention, the state determination device is configured to determine the state of the skids based on areas of regions surrounded by the outlines and the pass lines.

In yet another embodiment of the present invention, the state determination device is configured to determine the state of the skids based on thicknesses of the skids based on the outlines.

In yet another embodiment of the present invention, a notification device configured to notify a predetermined warning or alarm based on a determination result by the state determination device is further provided.

In yet another embodiment of the present invention, the state determination device further includes: a learning unit having a learning model generated by learning relation between a plurality of pieces of the image information, and the state of the skids classified into a plurality of groups; and a defect prediction device configured to determine the state of the skids based on the learning model, and determines necessity of a warning or an alarm, and a type of the warning or the alarm, as well as whether or not processing is to be continued, in accordance with the state of the skids, and the notification device has a display unit configured to visually display the warning or the alarm based on the determination result by the defect prediction device.

In yet another embodiment of the present invention, the learning unit is configured to generate the learning model by performing at least one of: learning processing using a plurality of pieces of image information of deposited spatters deposited between the protrusions of the skids, distances from the pass lines connecting the top points of the plurality of protrusions in the respective pieces of image information to valley portions appearing between the protrusions, and/or areas of background regions of the skids, as a learning sample; learning processing using a plurality of pieces of image information including deposited spatters deposited on wall surfaces of the skids, and thicknesses of the deposited spatters, as a learning sample; learning processing using a plurality of pieces of image information including skid deposits adhered to the skids, areas of the skid deposits, as a learning sample; learning processing using image information of a plurality of the skids with loss, and a loss ratio of each of the skids, as a learning sample, and the defect prediction device is configured to input, to the learning model, the image information obtained by imaging the skid table with the imaging device, and display a prediction score indicating the state of the skids.

A skid state determination method according to the present invention is a skid state determination method to be executed in a laser processing system including: a laser processing machine configured to process a workpiece with a laser beam; a skid table provided with a plurality of skids for supporting the workpiece with a supporting surface formed by top points of a plurality of protrusions; a processing pallet configured to be carried into and out from the laser processing machine together with the skid table and the workpiece; an imaging device configured to be able to image at least a part of the skid table on the processing pallet at a position of the processing pallet immediately before the processing pallet is carried into the laser processing machine and immediately after the processing pallet is carried out from the laser processing machine; and a state determination device configured to determine a state of the skids based on image information obtained by imaging the skid table with the imaging device, and includes: first determining of determining, by the state determination device, the state of the skids based on the image information obtained by imaging the skid table with the imaging device, before the workpiece is carried onto the skid table; and second determining of determining, by the state determination device, the state of the skids based on the image information obtained by imaging the skid table with the imaging device, after the processing pallet is carried out from the laser processing machine but before a product obtained by processing the workpiece is carried out from the skid table.

Advantageous Effects of Invention

According to an aspect of the present invention, it is possible to more precisely and accurately identify and grasp a skid state, and determine a defect resulting from the skid state with high accuracy.

BRIEF DESCRIPTION OF DRAWINGS

FIG. 26 is a diagram for illustrating a method for detecting a welded scrap.

DESCRIPTION OF EMBODIMENT

Hereinafter, a skid state determination device, a skid state determination method, and a laser processing system according to an embodiment of the present invention will be described in detail with reference to the attached drawings. However, the following embodiment does not limit the invention according to each claim, and not all combinations of features described in the embodiment are essential for the solution of the invention.

Figure 1:
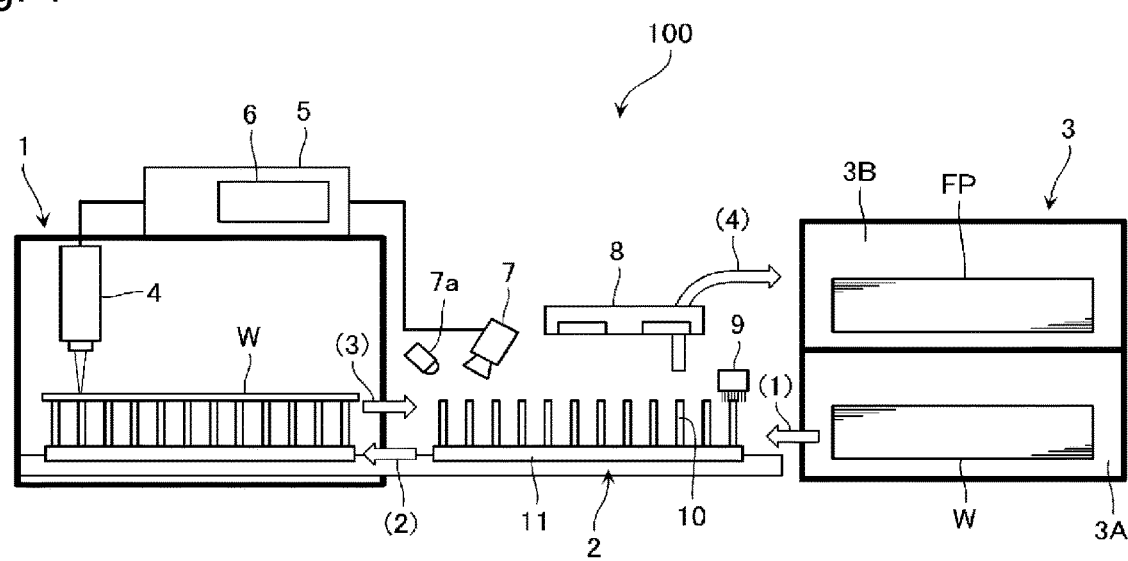
FIG. 1 is an explanatory diagram illustrating a schematic configuration of a laser processing system including a skid state determination device according to an embodiment of the present invention.
Figure 2:
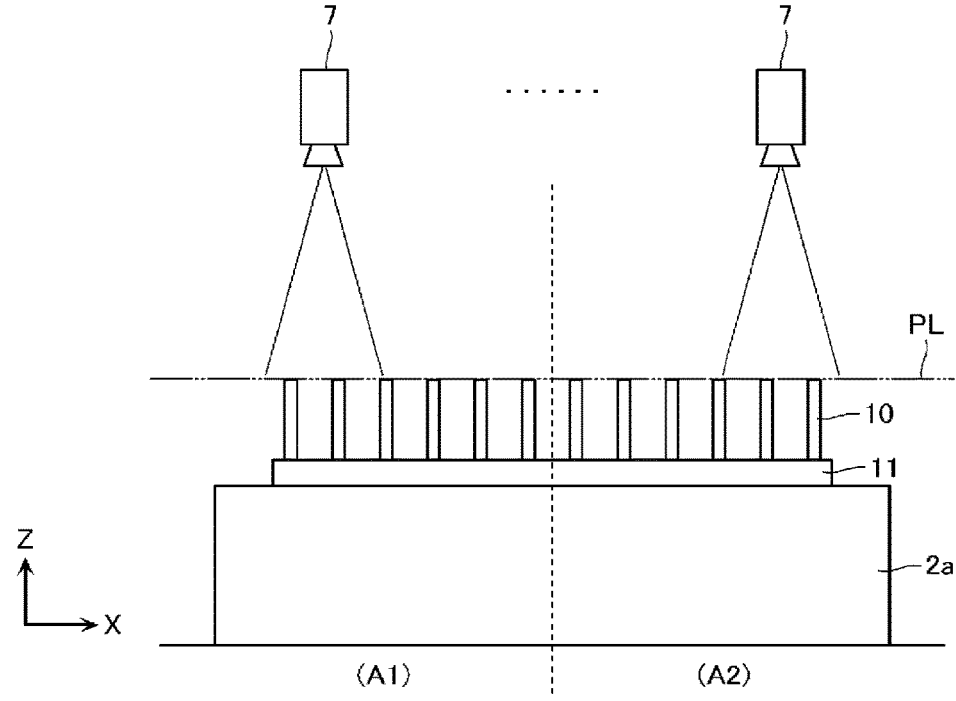
FIG. 2 is a diagram for illustrating an operation method of an imaging device.
Figure 3:
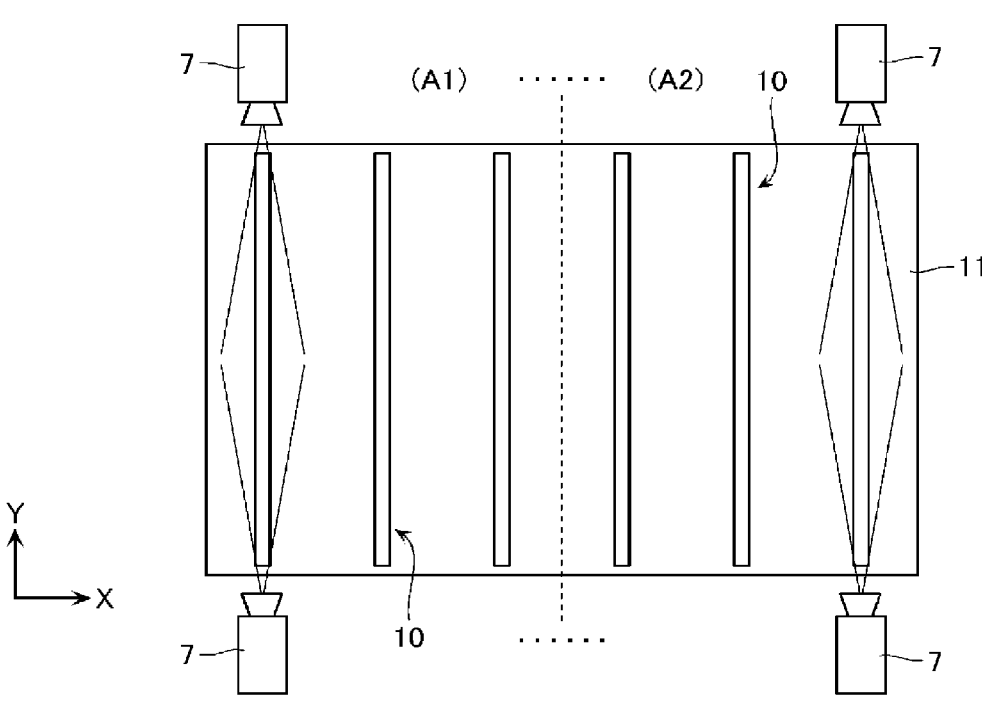
FIG. 3 is a diagram for illustrating the operation method of the imaging device.
Figure 4:
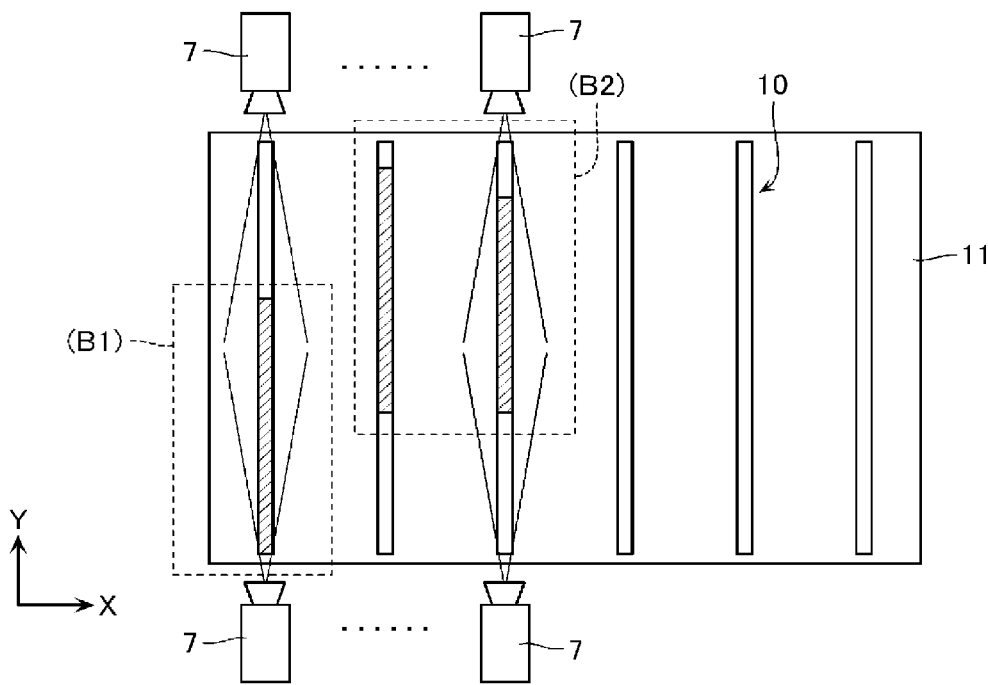
FIG. 4 is a diagram for illustrating the operation method of the imaging device.

FIG. 1 is an explanatory diagram illustrating a schematic configuration of a laser processing system 100 including a skid state determination device according to an embodiment of the present invention, and FIG. 2 to FIG. 4 are diagrams for illustrating an operation method of imaging devices. The basic configuration and structure of the laser processing system 100 are already known, and therefore only the outline will be described herein, excluding parts that require explanation. It goes without saying that in the laser processing system 100, a skid state determination method according to the embodiment of the present invention is also executed.

In the following description, the "X direction" means the lateral direction of a skid (thickness direction of the skid), the "Y direction" means the longitudinal direction of the skid (longitudinal direction of the skid), and the "Z direction" means the up-down direction (vertical direction) that intersects the X direction and the Y direction. Furthermore, in this embodiment, the scale and the dimensions of each component may be exaggerated, and some components may be omitted.

As illustrated in FIG. 1, the laser processing system 100 includes a laser processing machine 1, a shuttle table 2, and an automatic shelf 3. Theses laser processing machine 1, shuttle table 2, and automatic shelf 3 are configured to be able to cooperate with each other by, for example, computer automation.

The laser processing system 100 includes imaging devices 7, each of which is installed, for example, on a side closer to the shuttle table 2 with respect to a carrying-in/out port (not illustrated) of the laser processing machine 1, that is, outside the laser processing machine 1, a carrying-in/out fork 8, and a cleaning brush 9 for cleaning a skid 10 described later.

The laser processing machine 1 is a processing machine that performs processing (cutting, drilling, or the like) for a workpiece (material) W with a laser beam. As the workpiece W that is an object to be processed by the laser processing machine 1, for example, a plate-like metal base material (sheet metal) is used. The laser processing machine 1 mainly includes a laser oscillator (not illustrated), a laser processing head 4, an NC device 5 that controls the laser processing head 4 in accordance with a processing condition for processing the workpiece W, and an assist gas supply device (not illustrated) that supplies assist gas.

Specifically, the NC device 5 functions as a processing control device for the laser processing machine 1, and also functions as a control device for controlling the entire laser processing system 100 including the skid state determination device according to this embodiment. Therefore, in this NC device 5, a state determination device 6 capable of determining a state of the skid 10 is provided. In addition, as notification means, a display device (not illustrated) capable of displaying various information on a display, an audio output device (not illustrated) capable of outputting audio information, and other devices are connected to the NC device 5.

The shuttle table 2 has, for example, a free bear table (not illustrated), and a processing pallet (see FIG. 2, and other FIG. 2a, and the like, and a skid table 11 mounted on this processing pallet 2a is driven movably together with the processing pallet 2a in, for example, at least the X direction among the X direction and the Y direction.

On the skid table 11 mounted on the processing pallet 2a, a plurality of the skids 10 each having a plurality of protrusions 12 (see FIG. 10, FIG. 11, FIG. 12 and other figures) having a pinholder-shape with sharp tip ends (top points) or a pin-shape (comb-teeth-shape) are arranged at intervals in the X direction such that, for example, the length direction is along the Y direction. In other words, in a state in which the plurality of skids 10 are arranged on the skid table 11 at predetermined intervals in the thickness direction (X direction), the tip ends of the protrusions 12 are mounted so as to be dotted in the same plane (supporting surface). Therefore, the skid table 11 is configured to support a bottom surface of the workpiece W with the tip ends of the protrusions 12 of the plurality of skids 10.

Specifically, the shuttle table 2 carries the workpiece W placed on the skid table 11 into the laser processing machine 1 through the carrying-in/out port of the laser processing machine 1 together with the processing pallet 2a. In addition, the shuttle table 2 carries the workpiece W after laser processing by the laser processing machine 1 to the outside of the laser processing machine 1 together with the skid table 11 and the processing pallet 2a.

In the process of the laser processing, the automatic shelf 3 is configured to be able to automatically house, for example, a plurality of unprocessed workpieces W in a lower stage part 3A and house a plurality of products FP obtained by processing the workpieces W in an upper stage part 3B by computer automation. The carrying-in/out fork 8 that is driven by automation carries in and out (transfers) the workpiece W or the product FP between the shuttle table 2 and the automatic shelf 3.

In the laser processing system 100 configured in this manner, the laser processing is automatically performed by, for example, the following operation. First, when the system is activated and operation is started, as illustrated by a white arrow (1) in FIG. 1, an unprocessed workpiece W is transported from the lower stage part 3A of the automatic shelf 3 to the processing pallet 2a of the shuttle table 2, and placed on the skid table 11.

Next, as illustrated by a white arrow (2) in FIG. 1, the workpiece W on the skid table 11 is moved to the laser processing machine 1 together with the processing pallet 2a in order of processing on the shuttle table 2, and carried into the laser processing machine 1 from the carrying-in/out port. Then, the workpiece W is subjected to laser processing according to a processing condition in the laser processing machine 1. The product FP obtained by processing the workpiece W is carried out from the laser processing machine 1 through the carrying-in/out port together with the processing pallet 2a, as illustrated by a white arrow (3) in FIG. 1. The product FP carried out together with the processing pallet 2a is moved away from the laser processing machine 1 together with the processing pallet 2a on the shuttle table 2. Then, as illustrated by a white arrow (4) in FIG. 1, the product FP is removed from skid table 11 by the carrying-in/out fork 8 and housed in the upper stage part 3B of the automatic shelf 3. In a case of continuous processing, the next workpiece W is carried onto the skid table 11 from which the product FP is carried out, and waits to be carried into the laser processing machine 1. Thereafter, the same operation is repeated.

In the laser processing system 100 that operates in this manner, in order to identify and grasp the state of the skids 10 in a shorter span during system operation, the state determination device 6 of this embodiment monitors (performs monitoring) the state of the skids 10 by imaging of at least a part of the skid table 11 (predetermined imaging range) by the imaging devices 7 before carrying-in and after carrying-out with respect to the laser processing machine 1.

Each imaging device 7 is provided so as to be able to image the skids 10 within the imaging range set in the skid table 11 on the processing pallet 2a, specifically outside the laser processing machine 1, from a periphery. The imaging device 7 is composed of, for example, a known optical camera that captures a visible beam, and a three-dimensional distance image sensor that acquires three-dimensional distance images by transmitting laser beams to perform scanning, and receiving reflected beams.

Herein, the "periphery" is used as the meaning including any direction (arbitrary direction) toward an origin from an arbitrary point in a three-dimensional space defined by the X-direction, the Y direction and the Z-direction. Therefore, each imaging device 7 is disposed so as to be able to not only image an imaging range from, for example, the X-direction, the Y-direction, and the Z-direction but also image the imaging range from the direction intersecting at least the Z-direction, and intersecting the horizontal direction formed by the X-direction and the Y-direction (hereinafter collectively referred to as the "oblique direction") such that this arbitrary direction can be used as the imaging direction.

The imaging device 7 can be disposed regardless of whether the imaging device 7 is a fixed type or a movable type (mobile type). The imaging device 7 preferably has performance to obtain image information of the entire imaging range with one imaging. However, for example, in a case where it is not possible to obtain necessary image information by one imaging, a single movable type imaging device 7 capable of imaging an image while moving in the imaging range may be disposed. In a case where a limit to the imaging performance such as an imaging range and pixel accuracy is caused by placement at one place, a plurality of fixed type imaging devices 7 capable of imaging the imaging range from a plurality of locations may be disposed. The laser processing system 100 of this embodiment determines the state of the skids 10 on the skid table 11 based on the image information imaged by the imaging devices 7 disposed in this manner.

Examples of an actual operation method of the imaging devices 7 include as follows. FIG. 2 to FIG. 4 illustrate an example of dividing the imaging range on the skid table 11 in order to obtain pixel accuracy required to determine the state of the skids 10, for example. In the illustrated example, the Z-direction and the Y-direction are each represented as the imaging direction, but the imaging direction naturally includes the oblique direction as described above, and therefore is not limited to this.

As illustrated in FIG. 2 and FIG. 3, an example of dividing the imaging range includes, for example, to image the skids 10 in each of divided areas A1 and A2 from the upper side and the lateral side (image the Z-direction and the Y-direction of the skid table 11) by dividing the imaging range of the skid table 11 on the processing pallet 2a into the divided area A1 and the divided area A2. After the imaging, the image information of the divided area A1 and the image information of the divided area A2 are combined to obtain image information of the skids 10 in the entire imaging range. The number and the division range of these divided areas A1 and A2 can be appropriately set in accordance with the imaging performance (such as the imaging range, pixel accuracy, and an arrangement mode) of the imaging devices 7.

On the other hand, another example of dividing the imaging range includes, for example, to image the skid 10 from the upper side and the lateral side for each processing step by dividing the imaging range of the skid table 11 into areas in order of processing steps (shaded portions in the skids 10) as illustrated in FIG. 4, imaging a previous processing area B1 from the upper side and the lateral side, and thereafter imaging a next processing area B2 from the upper side and the lateral side, in order to improve efficiency of the image processing in the state determination device 6.

Consequently, image processing can be performed by sequentially obtaining the image information of the skids 10 in the imaging ranges of the processing areas B1 and B2 imaged in each processing step, and therefore it is possible to reduce an amount of data handled in one process. The imaging of the divided areas A1 and A2 or the processing areas B1 and B2 can be performed by imaging in the Z-direction and the Y-direction at once with a plurality of the installed imaging devices 7, or by imaging while moving, in the X-direction, the imaging device 7 enabling imaging in the Z-direction and the Y-direction.

A backlight source 7a (see FIG. 1, and other figures) that illuminates the imaging range (irradiates the imaging range with a beam) from the direction different from the imaging direction described above (for example, the direction symmetrical to the imaging direction with respect to the vertical direction, the direction opposite to the imaging direction, or the like, hereinafter collectively referred to as the "irradiation direction") is preferably provided together with each imaging device 7. Each backlight source 7a is provided, so that when the imaging device 7 images the imaging range, the backlight source 7a can illuminate the imaging range from the irradiation direction. Consequently, the outline shape of each skid 10 within the imaging range can be made clearer, so that it is possible to image the shape which is made conspicuous, and obtain image information useful for determining the state of the skids 10. Specifically, a specific installation example of the imaging devices 7 will be described later.

The image information imaged by the imaging devices 7 in this manner is input to the state determination device 6 in the NC device 5 connected to the imaging devices 7, for example. Image processing and image analysis are performed for the image information of the image to be inspected (hereinafter referred to as an "inspection image") input to the state determination device 6. Edge (outline) detection and image comparison of the skids 10 can be performed by the image processing, and position information indicating the coordinates of a plurality of points that composes an outline connecting the edges of the skids 10 can be extracted by the image analysis, for example. Thus, the state determination device 6 has a function of a well-known image processing unit that includes a CPU and a GPU and can perform general image processing and image analysis.

Figure 5:
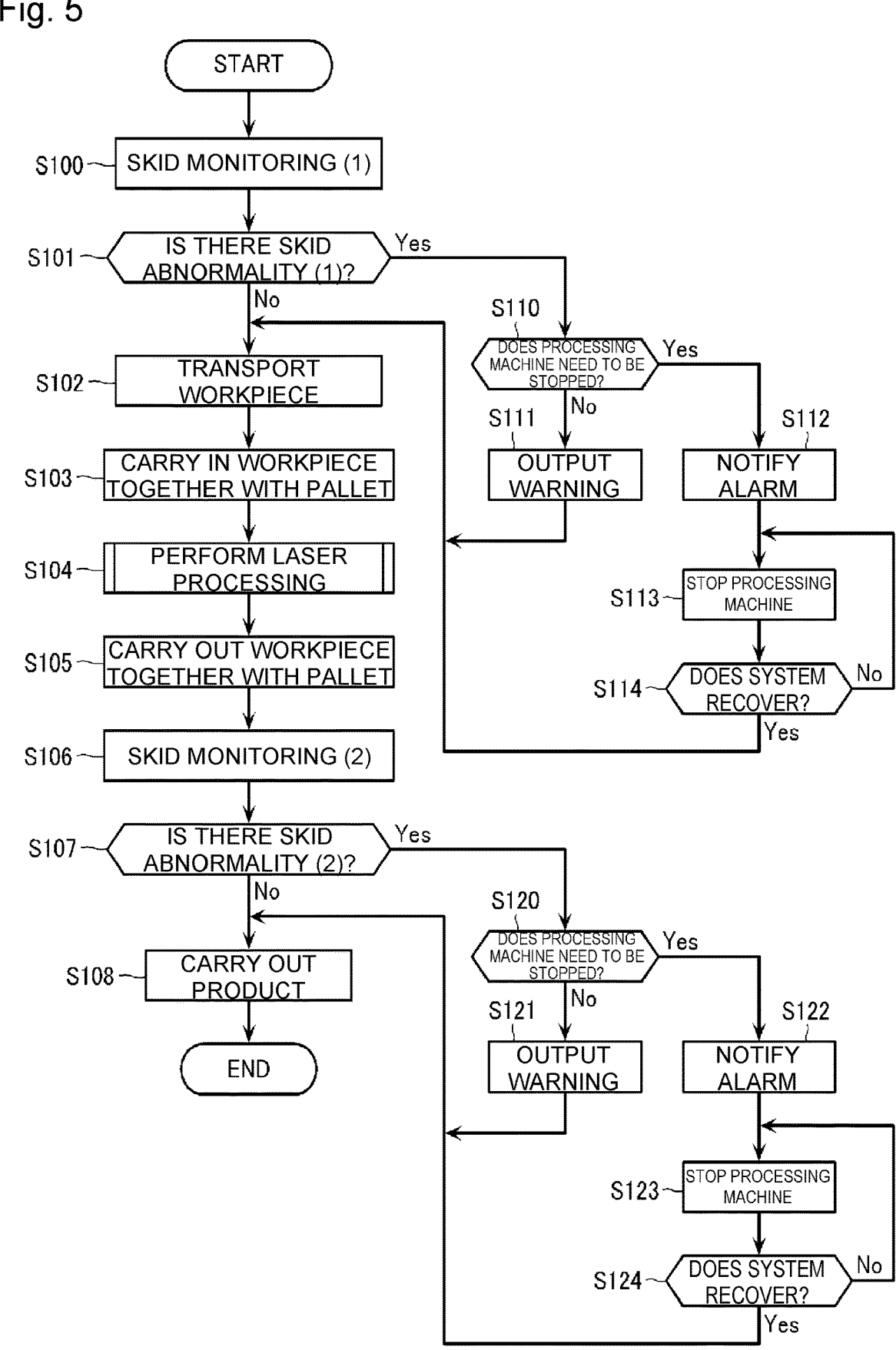
FIG. 5 is a flowchart illustrating monitoring operation by the skid state determination device.

Herein, monitoring operation for the state of each skid 10 by the state determination device 6 will be described. FIG. 5 is a flowchart illustrating the monitoring operation by the state determination device 6. Herein, a mode of determining the state of the skids 10 within the imaging range by comparing the inspection image of the skid table 11 with a previously imaged image as a reference (hereinafter referred to as a "reference image") will be described. The determination of the state of the skids 10 is not limited to image comparison, and various methods described later can be adopted. The reference image refers to an initial image imaged in an initial state, for example, immediately after arranging a plurality of the skids 10 on the skid table 11 and adjusting intervals, or the like.

First, before starting the monitoring operation, for example, the state determination device 6 images the skid table 11 from above in the direction oblique to the X-direction and from above in the Z-direction with each imaging device 7, acquires, as the reference image, an imaged image in the imaging range of the skid table 11 on which the skids 10 in an initial state are arranged, and stores the imaged image in a storage unit (not illustrated) in the NC device 5. The image analysis based on the stored reference image may also be performed, and a reference detection value (value representing the reference shape of each skid 10, or the like) capable of identifying and grasping the reference state of the skid 10 may be acquired.

Next, when the laser processing system 100 is operated and laser processing is started, imaging by the imaging devices 7 is started, and the first (initial) skid monitoring (1) is executed (Step S100). This skid monitoring (1) is performed, for example, before carrying the workpiece W onto the skid table 11. The reason why the skid monitoring (1) is performed before carrying the workpiece W onto the skid table 11 is to detect a defect that could not be detected by monitoring after previous processing during continuous processing. That is, in a case of the skid table 11 without the workpiece W placed thereon, a state of the protrusions 12 at an upper portion of each skid 10 can be easily grasped from above. In addition, during the continuous processing, a scrap and/or the like generated during the previous processing may be welded to the skid 10, but the scrap and/or the like may not be able to be detected until the product FP is carried out in the previous processing step. In this case, when the workpiece W is carried directly onto the skid table 11, the product FP may be damaged or a processing defect may occur. The skid monitoring (1) aims to avoid such a defect. In the skid monitoring (1), the imaged image in the imaging range of the skid table 11 before carrying-in is acquired as the inspection image, and stored in the storage unit in the NC device 5. The image analysis based on the stored inspection image may be also performed, and an inspection detection value (value representing the shape of the skid 10 at the time of inspection or the like) capable of identifying and grasping the state of the skid 10 at the time of inspection may be acquired.

In the skid monitoring (1), the inspection image before carrying-in is compared with the reference image, and it is determined whether or not there is skid abnormality (1) in the state of the skids 10 (Step S101). Examples of the skid abnormality (1) include deformation of the protrusions 12 due to, for example, deposition or welding of molten metal onto the skids 10, welding of a scrap, and damage to the protrusions 12, coordinate deviation in the X-direction and the Y direction of tip end positions of the protrusions 12.

In Step S101, in a case where it is determined that there is no skid abnormality (1) (No in Step S101), the workpiece W is transported, as described above, from the automatic shelf 3 to the skid table 11 on the processing pallet 2a of the shuttle table 2 (Step S102), and carried into the laser processing machine 1 together with the processing pallet 2a (Step S103).

Then, a laser processing process is performed in the laser processing machine 1 (Step S104), and the workpiece W (product FP) after processing is carried out from the laser processing machine 1 together with processing pallet 2a (Step S105). After carrying out, for example, each imaging device 7 starts imaging the skid table 11 again from below in the direction oblique to the Y-direction and the horizontal direction, and the second (next) skid monitoring (2) is performed (Step S106). Thus, the skid monitoring (2) is performed after the skid table 11 is carried out from the laser processing machine 1 but before the product FP is carried out from the skid table 11. The reason why the skid monitoring (2) is performed at this timing is that when the product FP is carried out by the carrying-in/out fork 8, the product FP, the carrying-in/out fork 8, or the like may be damaged depending on the welding state of a spatter to the skid 10 or the workpiece W after the laser processing. The handling of an image in the skid monitoring (2) is the same as that in skid monitoring (1) described above, and therefore description will be omitted herein.

In this skid monitoring (2), the inspection image after carrying-out is compared with the reference image, and it is determined whether or not there is the skid abnormality (2) in the state of the skids 10 (Step S107). The workpiece W is still placed on the skid table 11 after the skid table 11 is carried out but before the product FP is carried out, and therefore imaging is performed from below in the oblique direction (below the workpiece W) as described above.

Examples of the skid abnormality (2) include rising of scrap welding from the skid 10, welding of a scrap to the workpiece W, and unacceptable deposition of spatters. That is, during the execution of the skid monitoring (2), in a case where the above rising, welding, or deposition is recognized, it is determined that there is the skid abnormality (2).

In Step S107, in a case where it is determined that there is no skid abnormality (2) (No in Step S107), the product FP (workpiece W) is carried out (removed) from the skid table 11 and carried out to the automatic shelf 3 (Step S108). Thus, a series of monitoring operations ends.

This flowchart may be executed continuously repeatedly. In addition, in a case where a workpiece W to be processed next is carried onto the skid table 11 during the laser processing, the flowchart of this embodiment may be executed in parallel with a time lag.

On the other hand, in the above Step S101, in a case where it is determined that there is the skid abnormality (1) (Yes in Step S101), it is determined whether or not the laser processing machine 1 needs to be stopped depending on the degree of the skid abnormality (1) (Step S110), for example. In a case where it is determined that the laser processing machine does not need to be stopped (No in Step S110), a predetermined alarm indicating that the skid abnormality (1) occurs but the machine does not need to be stopped is output to, for example, the display device (Step S111), the process proceeds to the above Step S102, the workpiece W is transported, and the subsequent processes are repeated.

In a case where it is determined that the laser processing machine needs to be stopped (Yes in Step S110), a predetermined alarm indicating that the skid abnormality (1) occurs and the machine needs to be stopped is notified, for example, from the audio output device (Step S112), and the laser processing machine 1 is stopped in cooperation with the NC device 5 (Step S113). Examples of a machine stop condition in the skid monitoring (1) are a case where damage to the workpiece W due to adhesion of a scrap is predicted, and a case where contamination of the product FP due to rebounding of a spatter, welding of the workpiece W, occurrence of gouging are predicted from a state of deposition of a spatter on the skid 10, and a processing time, a processing position and the like of the laser processing to be executed from now when the laser processing is performed.

Thereafter, after the skid 10 on the skid table 11 is replaced, it is determined whether or not the laser processing system 100 recovers (Step S114), and the machine is continued to be stopped until the laser processing system 100 recovers (No in Step S114). When the laser processing system 100 recovers (Yes in step S114), the process proceeds to the above Step S102 and the subsequent processes are repeated.

On the other hand, in a case where it is determined that there is the skid abnormality (2) in Step S107 (Yes in step S107), the same processing as in the case of the skid abnormality (1) is performed. That is, in this case, the process proceeds to Step S120, and it is determined whether or not the laser processing machine 1 needs to be stopped, for example, depending on the degree of the skid abnormality (2) (Step S120). Examples of a machine stop condition in the skid monitoring (2) are a case where welding of a spatter to the lateral side of the skid 10 may interfere with the carrying-in/out fork 8, and equipment and the product FP may be damaged.

In a case where it is determined that the laser processing machine does not need to be stopped (No in Step S120), a predetermined alarm indicating that the skid abnormality (2) occurs but the machine does not need to be stopped is output (Step S121), the process proceeds to the above Step S108, the product FP is carried out to the automatic shelf 3, and a series of the monitoring operations ends. On the other hand, in a case where it is determined that the laser processing machine needs to be stopped (Yes in Step S120), a predetermined alarm indicating that the skid abnormality (2) occurs and the machine needs to be stopped is notified (Step S122), and the laser processing machine 1 is stopped (Step S123), and waits until the laser processing system 100 recovers (No in Step S124). When the laser processing system 100 recovers (Yes in step S114), the process proceeds to the above Step S108 and a series of the monitoring operations ends.

Thus, the monitoring operation of the state of the skids 10 is performed by the state determination device 6 of this embodiment, so that it is possible to determine the state of the skids 10, that is, the presence or absence of abnormality due to variation of the skids 10, in at least two stages, the stage before carrying the workpiece W onto the skid table 11 and the stage before carrying the product FP from the skid table 11.

Consequently, variation of the skids 10 that can occur during repeated laser processing can be identified and grasped in a short span, and therefore it is possible to more precisely and accurately identify and grasp the state of the skids 10 than before, and to determine the occurrence of a defect caused by the state of the skids 10 with high accuracy. In addition, the predetermined warning or alarm can be notified in accordance with the state of the skids 10, and therefore an operator (user) can recognize and respond to the cause of a processing defect that may occur due to the state of the skids 10 without directly monitoring a site. Furthermore, the operator can easily predict the occurrence of the processing defect even in a situation in which it is difficult to predict the processing quality of the product FP due to long system operation, and as a result, it is possible to prevent the processing defect and realize stable laser processing.

Figure 6:
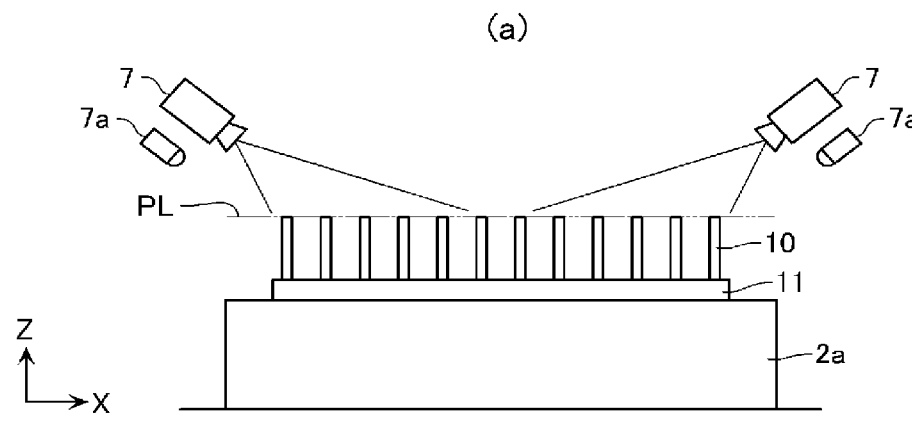
FIG. 6 is a diagram for illustrating an installation example of the imaging devices.
Figure 6:
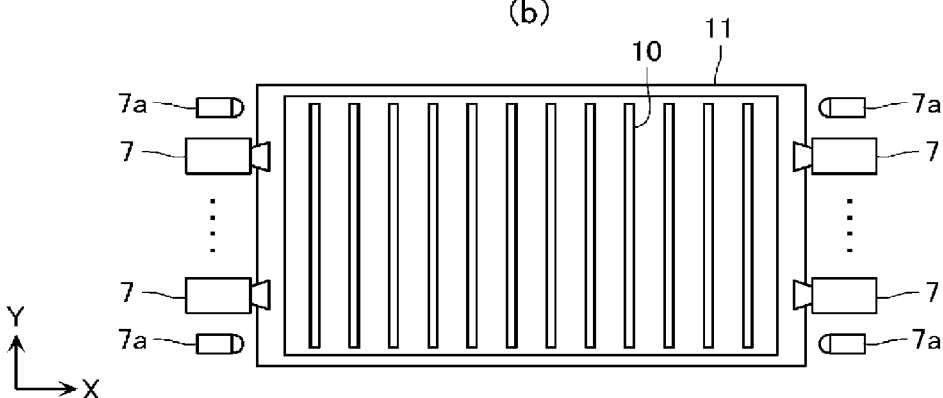

Now, an imaging method for an inspection image and a reference image using determination of the state of the skids 10 will be described in more detail. First, an image imaging method used in the case of the above skid monitoring (1) will be described. FIG. 6 is a diagram for illustrating an installation example of the imaging devices 7, in which FIG. 6(*a*) is a side view, and FIG. 6(*b*) is a top view.

In the above skid monitoring (1), monitoring is performed in a state in which the workpiece W is not placed on the skid table 11, and therefore imaging from above in the oblique direction is performed as illustrated in FIG. 6(*a*) and FIG. 6(*b*). That is, the imaging device 7 and the backlight source 7*a* are disposed at such positions as to be able to perform imaging from above in the direction oblique to the Z-direction and oblique to the X-direction. The respective numbers of the imaging devices 7 and the backlight sources 7*a* to be disposed may be added/reduced as necessary.

Figure 7:
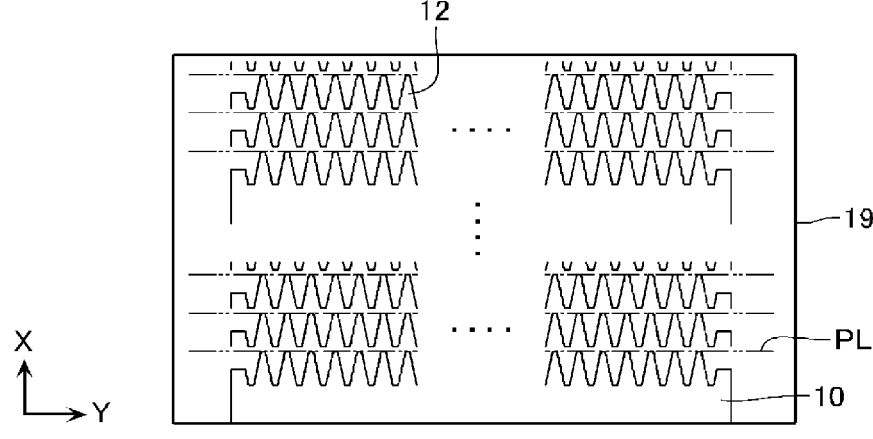
FIG. 7 is a diagram for illustrating an imaged image example.

As illustrated in FIG. 7, an image imaged (imaged image) by each of the imaging devices 7 arranged in this manner has a depth in the parallel installation direction (X-direction) of the skids 10 in the imaging range, and becomes an imaged image 19 that can accurately detect the outline shape of the protrusions 12 from the one surface side of each of the skids 10 arranged in the Y-direction. An imaged image 19 from the other surface side in the X-direction of each skid 10 may be obtained.

Figure 8:
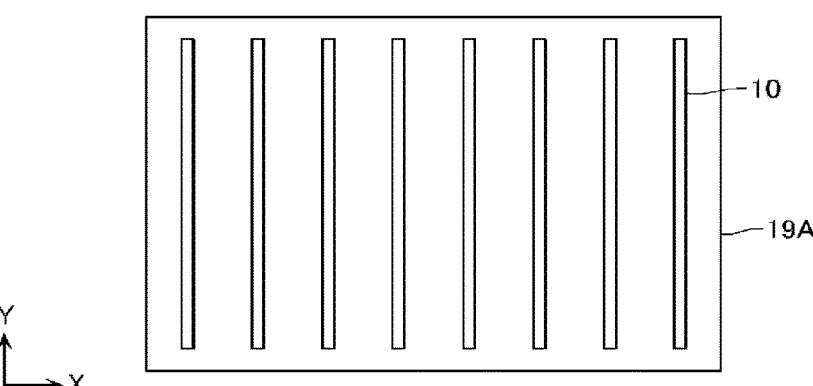
FIG. 8 is a diagram for illustrating an imaged image example.

In the skid monitoring (1), the workpiece W is not placed on the skid table 11, and therefore imaging from above in the Z-direction may be performed by the imaging devices 7 disposed as illustrated in FIG. 2. Thus, an imaged image 19A imaged from above in the Z-direction is illustrated in FIG. 8.

In this imaged image 19A, it is difficult to identify the uneven shape in the height direction of the protrusions 12 of each skid 10, but it is possible to identify and grasp the variation in the thickness direction (X-direction) of each skid 10. Therefore, when the imaged image 19 imaged from above in the oblique direction, and the imaged image 19A imaged from above in the Z-direction are used as the reference image and the inspection image, respectively, it is possible to determine various defects described below.

Figure 9:
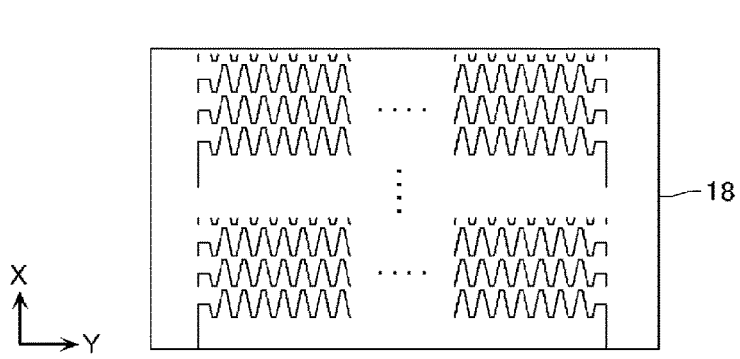
FIG. 9 is a diagram for illustrating pass line setting method.
Figure 9:
Figure 9:
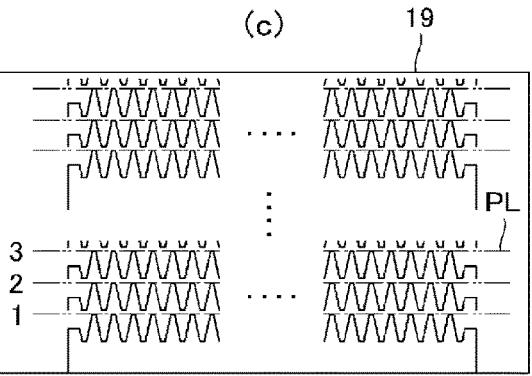

In the state determination device 6, pass lines PL are set in the imaged image 19. Herein, a method for setting the pass lines PL will be described. FIG. 9 is a diagram for illustrating a setting method for pass lines PL. The pass lines PL are set based on the top points (tip end positions) of the protrusions 12 of each skid 10 correctly installed on the skid table 11 in advance.

As illustrated in FIG. 9(*a*), a plurality of the skids 10 each having a depth in the X-direction are projected on an imaged image 18 before the pass lines PL are set. This imaged image 18 is temporarily stored, and predetermined pass lines PL (PL1, PL2, PL3, . . . ) are set on a screen 17 displayed on the display of the display device, for example, as illustrated in FIG. 9(*b*).

The pass lines PL to be set include theoretical lines in the laser processing machine 1 or lines drawn in advance on the image displayed on the screen 17. Theoretical lines can also be set using the coordinate values in a real space of top points 12*a* of the protrusions 12 of the skids 10, since the coordinate values are already known. As illustrated in FIG. 9(*c*), the imaged image 18 is adjusted such that the top points of the protrusions 12 fit the pass lines PL set on the screen 17 in this manner, so that it is possible to obtain the imaged image 19 in which the pass lines PL (PL1, PL2, PL3, . . . ) are set.

Figure 10:
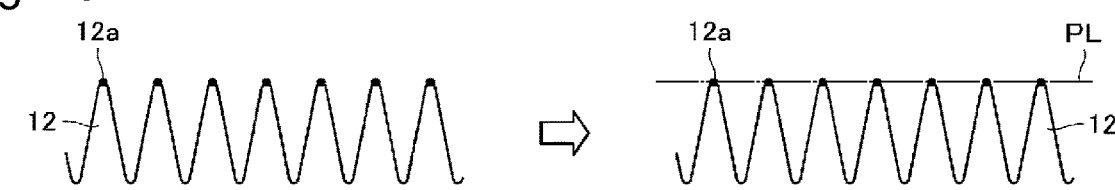
FIG. 10 is a diagram for illustrating the pass line setting method.

In addition to the above, the setting method of the pass lines PL includes a method illustrated in FIG. 10. That is, for example, image processing is performed for the imaged image 18, and the outline of each skid 10 is detected. Then, only the respective top points 12*a* of the protrusions 12 are extracted, and points are allocated to the top points 12*a*. Among the points allocated in this manner, a straight line placed on (coincides with) three or more points is obtained, and as illustrated by a white arrow in the figure, this straight line is set to the pass line PL. By such a method, the pass lines PL can be set.

Figure 11:
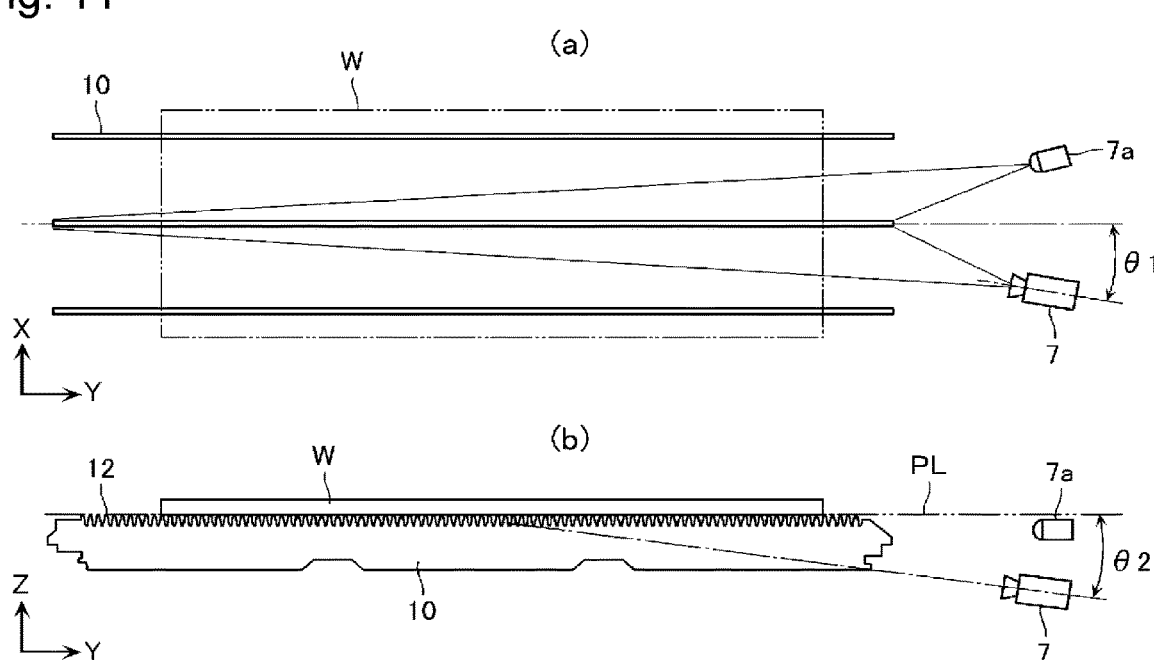
FIG. 11 is a diagram for illustrating an installation example of the imaging device.

Now, a method for imaging an image used in a case of the above skid monitoring (2) will be described. FIG. 11 is a diagram for illustrating an installation example of the imaging device 7, in which FIG. 11(*a*) is a top view, and FIG. 11(*b*) is a side view.

In the above skid monitoring (2), monitoring is performed in a state in which the workpiece W is placed on the skid table 11, and therefore imaging from below in the oblique direction is performed as illustrated in FIG. 11(*a*) and FIG. 11(*b*). That is, each imaging device 7 and each backlight source 7*a* are disposed at such positions as to be able to perform imaging from below in the direction oblique to the Y-direction and oblique to the horizontal direction (pass lines PL).

Specifically, each imaging device 7 is disposed so as to able to perform imaging with a predetermined angle θ1 (see FIG. 11(*a*)) with respect to the Y-direction, and with a predetermined angle θ2 (see FIG. 11(*b*)) with respect to the horizontal direction (pass lines PL). For example, each backlight source 7*a* is installed in accordance with the number of the skids 10 in the imaging range with an angle symmetrical to the predetermined angle θ1 with respect to the Y-direction, and disposed parallel to the horizontal direction, for example. In a case where the backlight sources 7*a* are installed in accordance with the number of the skids 10, beams are emitted sequentially, and the imaging devices 7 synchronizes with the emitted beams and sequentially preforms imaging. The predetermined angles θ1 and 02 can be set in accordance with the imaging range of each imaging device 7.

Figure 12:
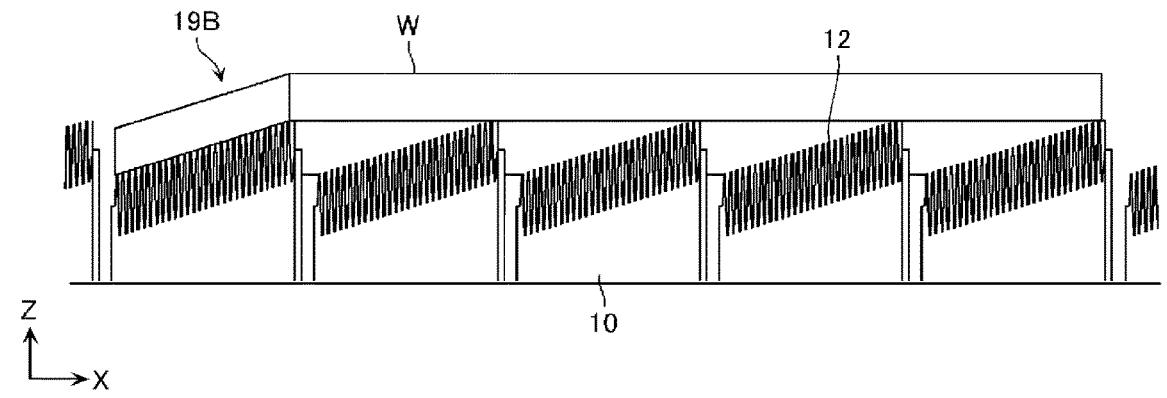
FIG. 12 is a diagram for illustrating an imaged image example.

As illustrated in FIG. 12, the imaged image imaged by each of the imaging devices 7 arranged in this manner becomes an imaged image 19B that can obliquely detect the outline shape of the protrusions 12 from the direction oblique to the Y-direction on the one surface side of each of the skids 10 aligned in the X-direction in the imaging range, below the workpiece W. The imaged image 19B may be obtained on the other surface side in the X-direction of each skid 10.

Figure 13:
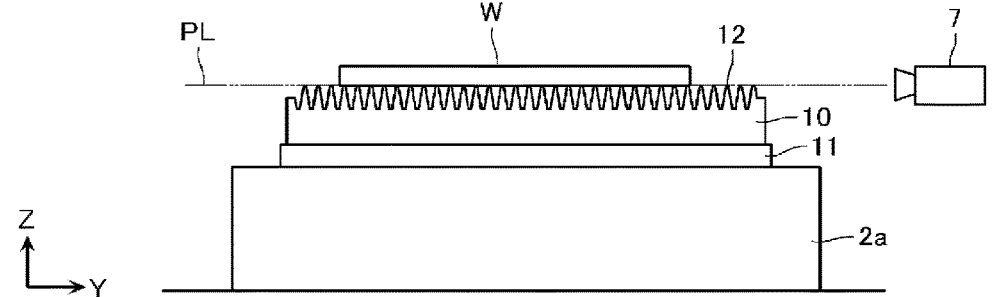
FIG. 13 is a diagram for illustrating an installation example of the imaging device.
Figure 14:
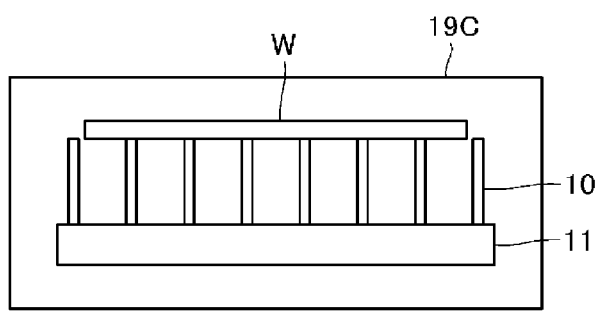
FIG. 14 is a diagram for illustrating an imaged image example.

In the skid monitoring (2), as illustrated in FIG. 13, the skid table 11 with the workpiece W placed thereon is imaged from the Y-direction. An imaged image 19C imaged from the Y-direction is illustrated in FIG. 14. In this imaged image 19C, it is difficult to identify the outline shape of the protrusions 12 of each skid 10, but it is possible to identify and grasp the variation in the thickness direction (X-direction) of each skid 10. Therefore, when the imaged image 19B imaged from below in the oblique direction, and the imaged image 19C imaged from the Y-direction are used as the reference image and the inspection image, respectively, it is possible to determine various defects described below similarly to the case of the skid monitoring (1).

Figure 15:
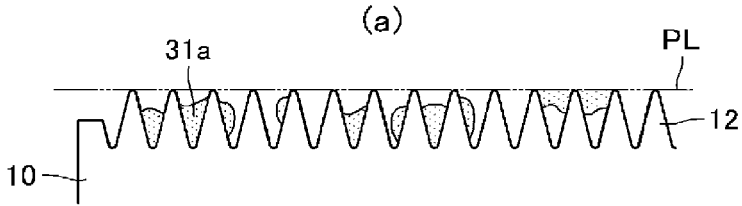
FIG. 15 is a diagram for illustrating defect detection targets.
Figure 15:
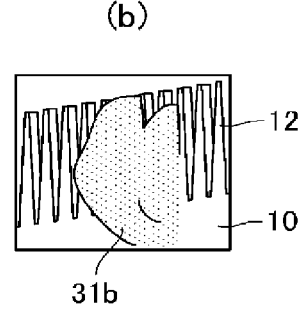
Figure 15:
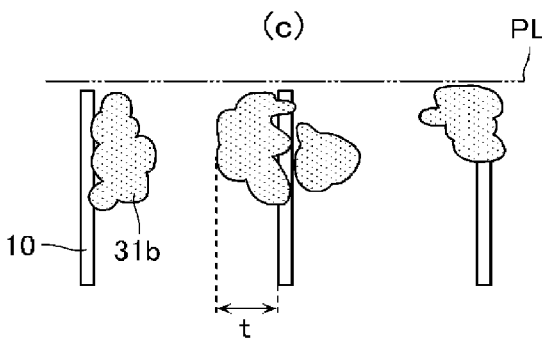
Figure 16:
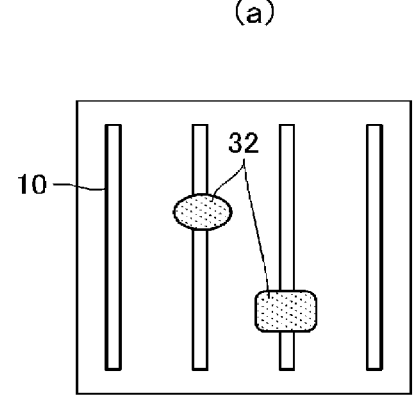
FIG. 16 is a diagram for illustrating defect detection targets.
Figure 16:
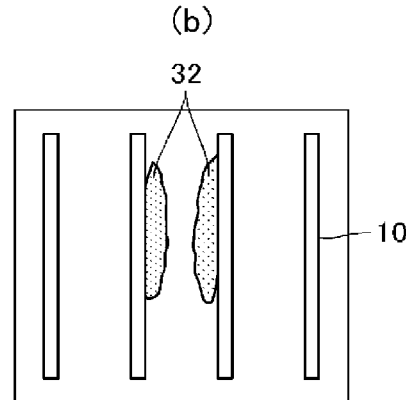
Figure 17:
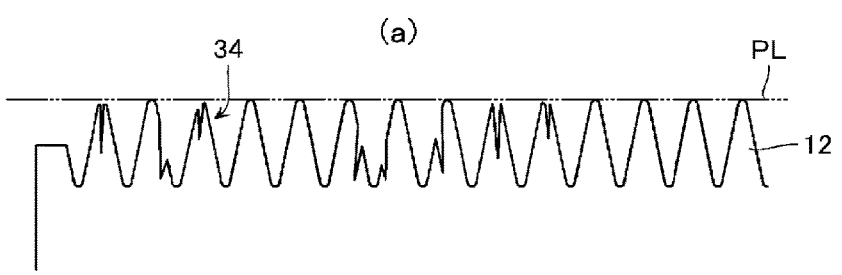
FIG. 17 is a diagram for illustrating defect detection targets.
Figure 17:
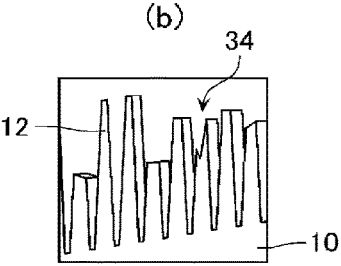

Now, the defect detection targets of the skids 10 related to the skid abnormalities (1) and (2) described above will be described. FIG. 15 to FIG. 17 are each a diagram for illustrating the defect detection targets of the skids 10.

The defect detection target of the skids 10 includes, for example, skid deposits such as deposited spatters 31a deposited between the protrusions 12 of each skid 10 below the pass line PL as illustrated in FIG. 15(a), and deposited spatters 31b deposited on wall surfaces of each skid 10 (surfaces facing in the X-direction) as illustrated in FIG. 15(b) and FIG. 15(c).

The defect detection target includes skid weld deposits such as welding scraps 32 welded above the skids 10 as illustrated in FIG. 16(a), and welding spatters (dross) 33 welded on the wall surfaces of the skids 10 as illustrated in FIG. 16(b). Furthermore, the defect detection target includes skid consumption due to burnout (loss) 34 of the protrusions 12 of the skids 10 as illustrated in FIG. 17(a) and FIG. 17(b). The state determination device 6 of this embodiment can identify these detection targets with high accuracy and determine the state of the skids 10.

First, as the skid deposits, a method for identifying the deposited spatters 31a deposited between the protrusions 12 as illustrated in FIG. 15(a) will be described. Herein, in order to identify the deposited spatters 31a, a distance (gap amount) S between the pass line PL and each deposited spatter 31a is detected. When the deposited spatters 31a are detected, the reference image and the inspection image imaged in the same composition as the above imaged image 19 can be used.

Figure 18:
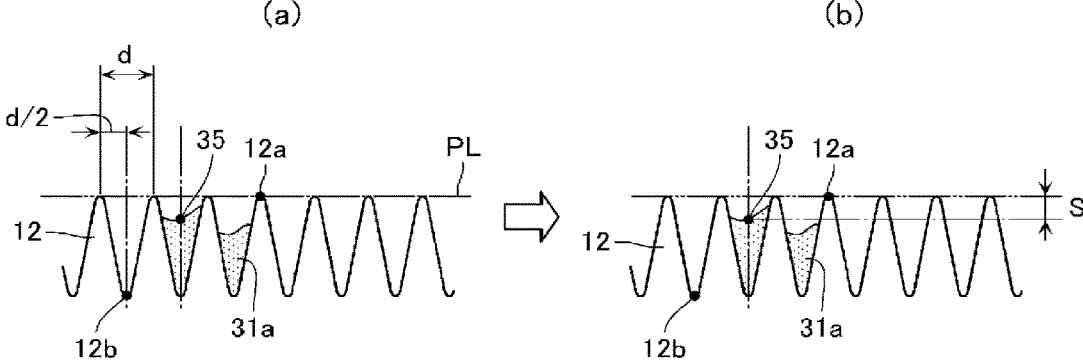
FIG. 18 is a diagram for illustrating an example of a method for identifying a deposited spatter.

As illustrated in FIG. 18(a), first, the outline shape of the protrusions 12 of each skid 10 is extracted, and a position of d/2 in a case where a pitch between the top points 12a of the protrusions 12 denotes d is labeled. In the skid 10 of the reference image, the position of the labeled d/2 is a valley bottom point 12b between the protrusions 12, but becomes a measuring point 35 of the deposited spatter 31a in a case where the deposited spatters 31a exist.

Then, the gap amount S between the measuring point 35 and the pass line PL is calculated, and the deposited spatter 31a is identified based on the calculated gap amount S. Specifically, in a case where the deposited spatter 31a does not exist, the gap amount S takes a maximum value as the reference detection value. On the other hand, in a case where the deposited spatter 31a exists, the gap amount S is smaller than the reference detection value as the inspection detection value.

Determination for this gap amount S is made by using a threshold value (user threshold value: for example, S1, S2, . . . , Sn, and the like) set arbitrarily in accordance with the degree of a defect (processing defect), so that a predetermined warning or alarm according to the degree of a defect in the skid abnormalities (1) and (2) can be performed.

Consequently, for example, in the case of a defect that does not have an immediate adverse effect on laser processing, the predetermined warning is simply displayed, and in a case of a high risk defect, a measure such as audio output of the predetermined alarm can be taken. This user threshold value can be set in accordance with the type such as a defect that obstructs gas flow, a defect due to workpiece welding occurrence, a defect due to gouging, and a defect due to rebounding of a spatter, depending on the state of the deposited spatter 31a.

On the other hand, in order to identify the deposited spatter 31a, a method using the outline of the protrusions 12 of the skid 10 can be adopted. In a case where the outline is used, first, the imaged image 19 of the skids 10 imaged by using the imaging devices 7 and the backlight source 7a before laser processing is acquired as the reference image. Next, image processing such as binarization processing is performed for the reference image, so that the reference image is divided into a skid region 36 and background regions 37 as illustrated in FIG. 19(a).

Then, a boundary portion of these regions 36 and 37 is extracted, a plurality of coordinates 38a are obtained, and a line connecting these coordinates 38a is set as a reference outline 38 of the protrusions 12. Next, the imaged image 19 of the skids 10 imaged using the imaging devices 7 and the backlight sources 7a after laser processing are acquired as an inspection image, and image processing is performed similarly to the case of the reference image, and, as illustrated in FIG. 19(b), the skid region 36 and the background regions 37 are extracted, and coordinates 38b are obtained, and inspection outlines 39 are set.

Next, an amount of upward displacement in the Z-direction of the coordinates 38b of this inspection outline 39 from the coordinates 38a of the reference outline 38 is calculated, and each deposited spatter 31a is identified by the calculated amount of upward displacement. Particularly, if identification is performed by focusing on the regions between the top points 12a of the protrusions 12, the accuracy of identification can be further improved. It is also possible to determine this displacement amount using the user threshold value as described above, and to perform the above predetermined warning or alarm.

Figure 20:
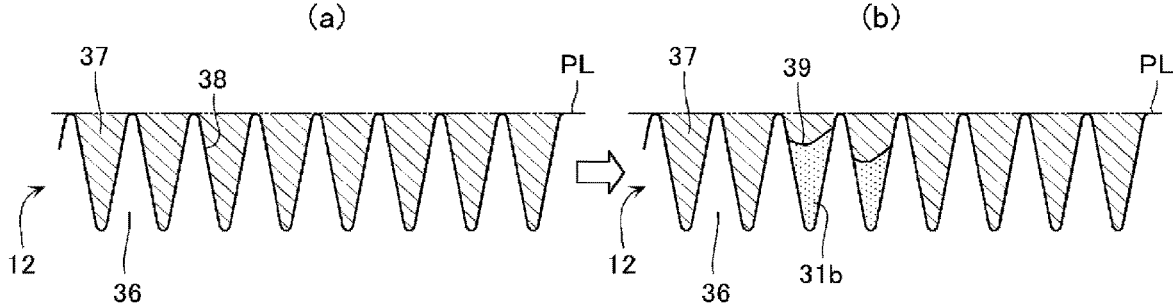
FIG. 20 is a diagram for illustrating an example of the method for identifying a deposited spatter.

Furthermore, in order to identify the deposited spatters 31a, a method using the area of the above background regions 37 can be adopted. In this case, first, as illustrated in FIG. 20(a), the areas of the background regions 37 (illustrated by slanting lines in the figure) surrounded by the reference outline 38 of the reference image and each pass line PL are calculated. Next, as illustrated in FIG. 20(b), the areas of the background regions 37 (illustrated by slanting lines in the figure) surrounded by the inspection outlines 39 of the inspection image and each pass line PL are calculated. Then, these areas are compared, the deposited spatters 31a are identified by the different amount between the areas. It is also possible to determine this difference amount by using the user threshold values as above, and perform the above predetermined warning or alarm.

Now, defect prediction by the deposited spatters 31b deposited on the wall surfaces of the skids 10 as illustrated in FIG. 15(b) and FIG. 15(c) will be described. Herein, the deposition thickness t (see FIG. 15(c)) of an identified deposited spatter 31b and a distance L between the skids 10 in the X-direction are used. When the deposited spatters 31b are detected, a reference image and an inspection image imaged with the same composition as the imaged image 19C described above are used. The imaged image 19A and the imaged image 19B can be used, but description thereof will be omitted.

Figure 21:
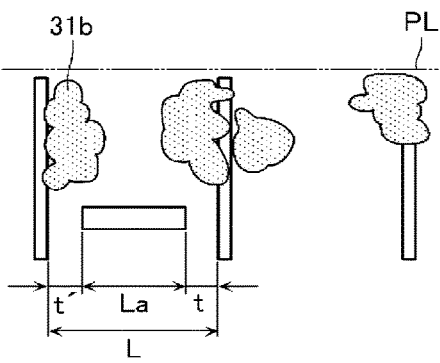
FIG. 21 is a diagram for illustrating prediction of a defect by deposited spatters.

First, as illustrated in FIG. 21, an outline shape is extracted from the imaged image 19C, a distance L between the wall surfaces of the skids 10 is calculated. In addition, deposited spatters 31b are identified from the outline shape, and the deposition thickness t is calculated. Then, in a case where the fork width of the carrying-in/out fork 8 is La, the defect prediction thickness is set to t'.

The defect prediction thickness t' can be calculated by adding a predetermined margin $\beta$ to a value obtained by subtracting the fork width La from a distance L and multiplying a resultant by ½ ($t'=(L-La)/2+\beta$). Then, for example, in a case where this defect prediction thickness t' is smaller than the deposition thickness t ($t<t'$), a predetermined warning or alarm for notifying interference of the carrying-in/out fork 8 to the skid table is performed.

In a case where the deposition thickness t is greater than a resultant obtained by multiplying the defect prediction thickness t' by $\alpha$ ($t>t'\times\alpha$), where a user set value for interference is $\alpha$ ($0<\alpha<1$), the predetermined warning or alarm for notifying the moment of the interference of the carrying-in/out fork 8 to the skid table 11 is issued. Also in this manner, the predetermined warning or alarm can be issued in accordance with the degree of a defect in the skid abnormalities (1) and (2).

Figure 19:
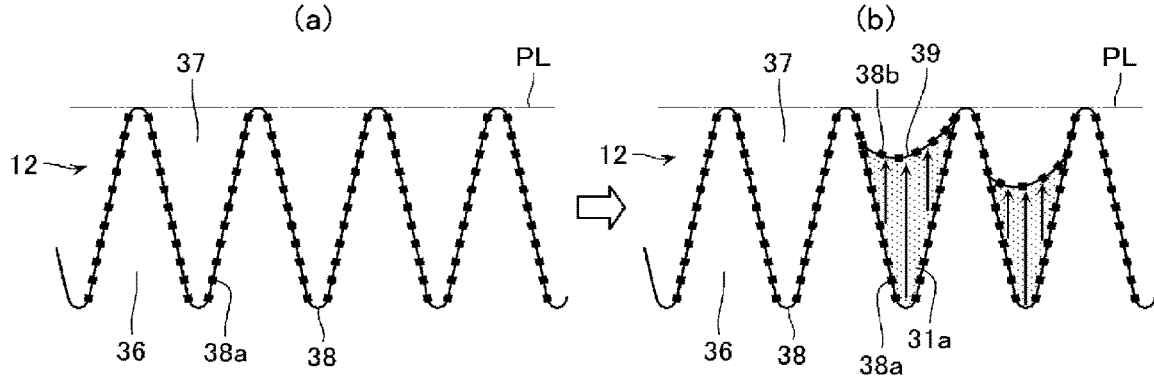
FIG. 19 is a diagram for illustrating an example of the method for identifying a deposited spatter.

Now, detection of skid consumption by the burnout (loss) 34 of the protrusions 12 of the skid 10 will be described. For the detection of this skid consumption, for example, the outline described using FIG. 19 is used. That is, as illustrated in FIG. 22(a), a plurality of the coordinates 38a are obtained in the reference image, and the reference outline 38 of the protrusions 12 is set.

Next, as illustrated in FIG. 22(b), a plurality of the coordinates 38b are obtained in the inspection image, and the inspection outline 39 is set. Then, the amount of downward displacement in the Z-direction of coordinates 38b of this inspection outline 39 from the coordinates 38a of the reference outline 38 is calculated, and the skid consumption is detected by the calculated amount of downward displacement. Particularly, coordinates of the top points 12a of the protrusions 12 of the reference outline 38, and coordinates of top points 12c of the protrusions 12 of the inspection outline 39 are focused and detected, so that it is possible to easily detect the skid consumption.

The position (loss portion) of the loss 34 of each protrusion 12 on the skid table 11 can be grasped based on the detected skid consumption, and the support state of the plate surface (back surface) of the workpiece W by the skids 10 can be determined. In addition, a loss ratio N of the protrusions 12 of the skids 10 is calculated, and the support state can be determined at the same time.

The loss ratio N (%) of the protrusions 12 can be calculated, for example, by multiplying a value obtained by dividing the number f of losses in the protrusions 12 of the skids 10 located below the workpiece W by the total number g of the protrusions 12 of the skid 10 located below the workpiece W, by 100 ($N=(f/g)\times100$). The quality of the support state of the workpiece W can be determined by this loss ratio N.

That is, in a case where the loss ratio N is less than a loss allowable value h preset by the user ($N<h$), it can be determined that the support state is good. On the other hand, in a case where the loss ratio N is greater than or equal to the loss allowable value h ($N\geq h$), it can be determined that the support state of the workpiece W by the skids 10 is bad, and a defect such as occurrence of inclination on the plate surface of the workpiece W, and occurrence of fluttering on the workpiece W can be predicted.

Figure 23:
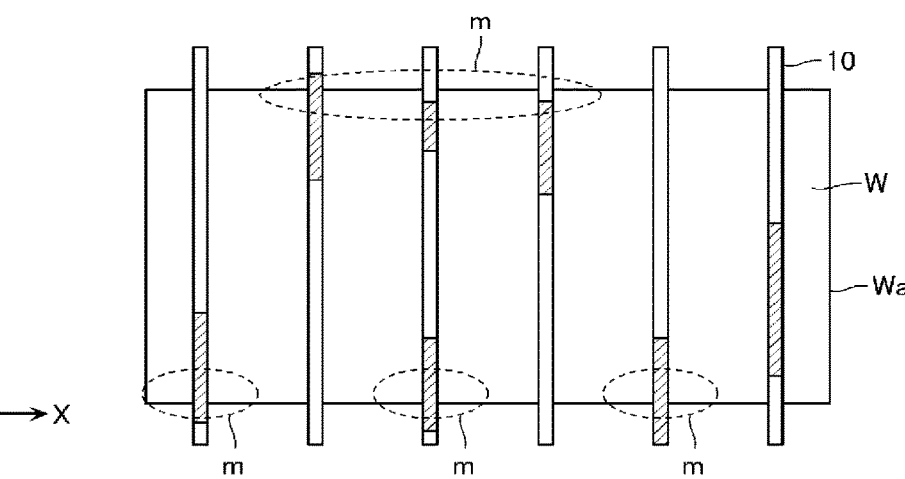
FIG. 23 is a diagram for illustrating a distribution of loss portion regions of skids.
Figure 24:
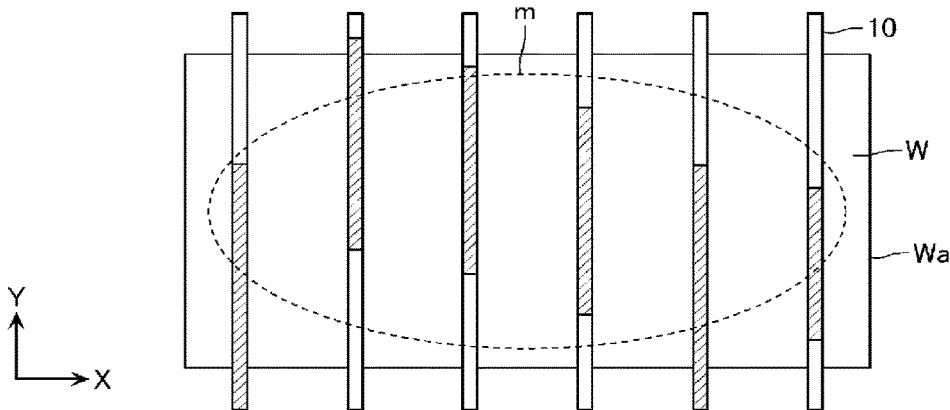
FIG. 24 is a diagram for illustrating the distribution of the loss portion regions of the skids.

Then, the loss portions of the protrusions 12 are added to this determination result, so that it is possible to more precisely determine the concrete support state of the workpiece W. That is, assuming that the loss ratio N is greater than or equal to the loss allowable value h ($N\geq h$), in a case where loss portion regions m in the skids 10 are widely distributed near end surfaces Wa on four sides of the workpiece W or outside the end surfaces Wa as illustrated in FIG. 23, it is expected that the workpiece W bends in a convex shape as viewed from the horizontal direction. In a case where the loss portion regions m are widely distributed near the center of the workpiece W or inside the end surfaces Wa as illustrated in FIG. 24, it is expected that the workpiece W bends in a concave shape as viewed from the horizontal direction.

In a case where it is expected that the workpiece W bends in a convex shape, a defect such as bending of the workpiece W and fluttering of the workpiece W due to assist gas can be notified as the predetermined warning or alarm in the skid abnormalities (1) and (2). In a case where it is expected that the workpiece W bends in a concave shape, a defect such as bending of the workpiece W and present of a falling object on the workpiece W can be notified similarly.

Now, detection of the skid weld deposits due to the welding spatters (dross) 33 welded on the wall surfaces of the skids 10 as illustrated in FIG. 16(b) will be described. For this detection of the skid weld deposits, for example, the outline described using FIG. 19 is used. That is, as illustrated in FIG. 25(a), the skid region 36 and the background regions 37 are extracted in the reference image, a plurality of the coordinates 38a are obtained, the reference outline 38 of the protrusions 12 is set, and the areas of the background regions 37 below the pass line PL which is a portion closed by the pass line PL and the reference outline 38 (areas of the portions illustrated by the slanting lines in the figure) are calculated.

As illustrated in FIG. 25(b), the inspection outlines 39 that divides the inspection image into the skid region 36 and regions of the dross 33 and the deposited spatters 31a, and the background regions 37 are extracted, and a plurality of the coordinates 38b that defines the inspection outlines 39 are obtained. Then, the inspection outlines 39 are classified into the closed inspection outlines 39 that include the pass line PL and the closed inspection outlines 39 that do not include the pass line PL, from the coordinates 38b of the inspection outlines 39. There is a possibility that the dross 33 adheres between the pass line PL and the closed inspection outlines 39 that do not include the pass line PL. In addition, there is a possibility that the deposited spatters 31a are deposited under the closed inspection outlines 39 that include the pass line PL. Therefore, the n background regions 37 aligned between n+1 protrusions 12 in the Y-direction are classified into the n1 background regions 37 including the inspection outlines 39 without the pass line PL, and the n2 background regions 37 including the inspection outlines 39 including the pass line PL. Next, the total area B of the background regions 37 surrounded by the inspection outlines 39 that do not include the pass line PL and the total area C of the background regions 37 surrounded by the inspection outlines 39 that include the pass line PL are calculated.

Then, where the area of the one background region 37 between a pair of the protrusions 12 that can be calculated from the reference outline 38 is A, in a case where the area A×n1 and the area B are compared, and the area B of the inspection image is less than the area A×n1 of the reference image, erroneous identification portion (portion erroneously identified as the skid region 36) that is in contact with the pass line PL and connected to the skid region 36 below the pass line PL is detected. This detected erroneous identification portion corresponds to the dross 33 as the skid weld deposit. When the area A×n1−B of the detected erroneous identification portion is calculated, an welding amount of the dross 33 in the background region 37 can be calculated, and therefore the predetermined warning or alarm can be issued in accordance with the welding amount. In addition, when the area A×n2−C is calculated, an amount of the deposited spatters 31a can be approximately predicted.

Figure 26:
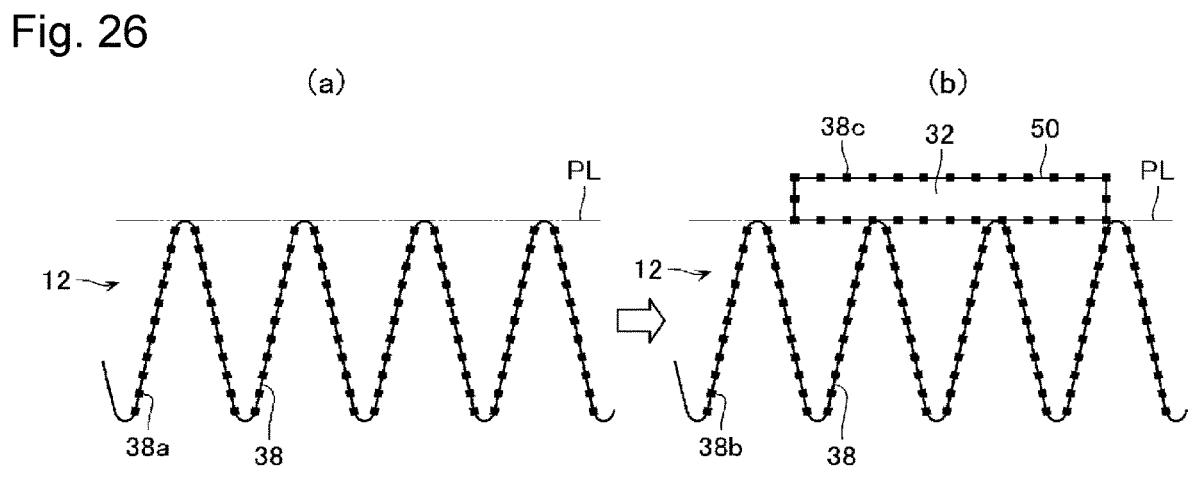

On the other hand, detection of skid weld deposits due to the welding scraps 32 welded on the upper sides of the skids 10 as illustrated in FIG. 16(a) is performed as follows. That is, as illustrated in FIG. 26(a), a plurality of the coordinates 38a are obtained in the reference image, and the reference outline 38 of the protrusions 12 is set. As illustrated in FIG. 26(b), a plurality of the coordinates 38b are obtained in the inspection image, and the inspection outline 39 of the protrusions 12 is set.

Then, when this inspection outline 39 is set, in a case where a plurality of coordinates 38c on and above the pass line PL are obtained, and a geometric-shaped outline 50 connecting the coordinates 38c is detected, a portion surrounded by this outline 50 is detected as the welding scrap 32. Thus, when the welding scrap 32 is detected on the pass line PL, occurrence of a processing defect with increase in the thickness of the workpiece W is predicted, and therefore the predetermined warning or alarm is issued, and the skid 10 is cleaned by the cleaning brush 9.

The state determination device 6 may have, for example, a machine learning function. In this case, the state determination device 6 includes, for example, a learning unit having a learning model generated by learning relation between a plurality of pieces of the image information obtained by the imaging devices 7 of the above embodiment, and the state of the skids 10 classified into a plurality of groups, and a defect prediction unit that determines the state of the skids 10 based on this learning model, and determines necessity of the warning or the alarm, and the type of the warning or the alarm, as well as whether or not processing is to be continued, based on the state of the skids.

The NC device 5 visually displays the warning or the alarm on the display of the display device based on the determination result by the defect prediction unit, for example. An example of the warning or the alarm includes, for example, to represent how close (or how far) the determined state of the skids 10 is to (from), with a visible score format as a predicted score.

Figure 25:
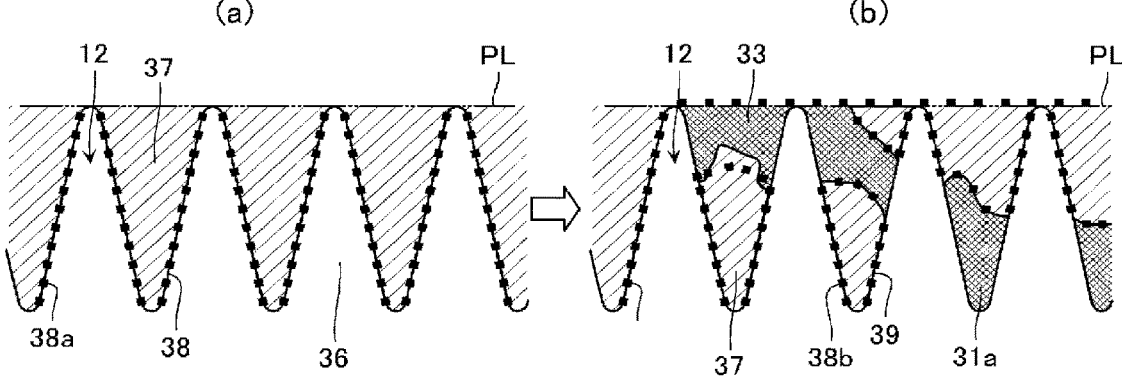
FIG. 25 is a diagram for illustrating a method for detecting a welded spatter.

The learning unit learns for each aspect of the defect, for example, (1) learns a plurality of pieces of image information of the deposited spatters 31a deposited between the protrusions 12 of the skids 10, numeral values such as the gap amount S from each pass line PL to each measuring point 35 described in FIG. 15 in each image information and the areas A, B and C of the background regions 37 described in FIG. 25, as a learning sample, (2) learns a plurality of pieces of image information including the deposited spatters 31b deposited on the wall surfaces of the skids 10, and the thickness t of each deposited spatter 31b, as a learning sample, (3) learns a plurality of pieces of image information including skid deposits such as the welding scraps 32 welded on the upper sides of the skids 10, and the welding spatters (dross) 33 welded on the wall surfaces of the skids 10, and numeral values such as the area surrounded by the outline 50 detected on each pass line PL or the thickness of each side surface, as a learning sample, and (4) learns image information of a plurality of the skids 10 with the loss 34 that occurs due to the burnout of the skids 10, and the loss ratios N, and the like, as a learning sample.

Figure 22:
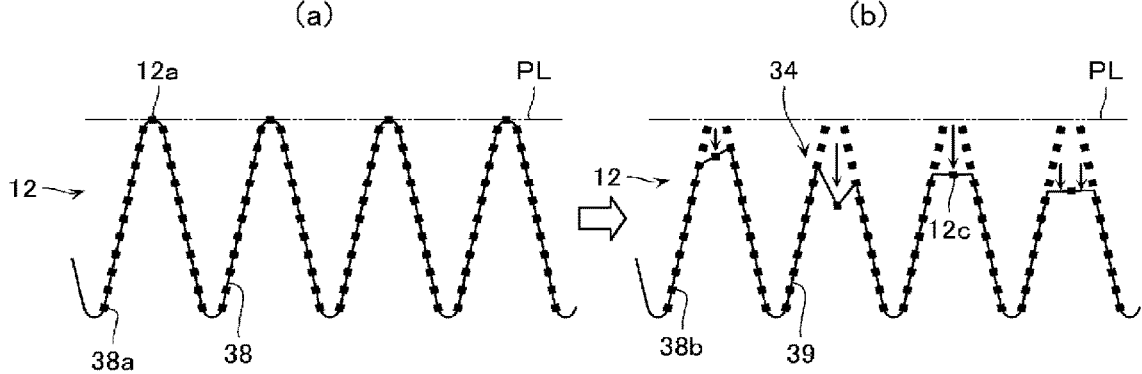
FIG. 22 is a diagram for illustrating a method for detecting skid consumption.

Then, the defect prediction unit performs arithmetic processing by inputting the inspection image to the learning model of the learning unit, so that it is possible to display a prediction score in order to use for operator's (user's) determination as to whether the state of the skids 10 imaged by the imaging devices 7 is suitable for continuing laser processing. For example, as illustrated in FIG. 18(b), when the gap amount S between the measuring point 35 equivalent to the valley bottom of the skid 10 and the pass line PL is narrowed, the state is away from the reference state, and therefore the prediction score is lowered. As illustrated in FIG. 22, as the inspection outline 39 of the skid 10 is further scraped with respect to the reference outline 38, the state of the skid 10 is further away from the reference state, and therefore the prediction score is lowered. As illustrated in FIG. 25, as the area of each background region 37 is reduced, the state of the skid 10 is further away from the reference state, and therefore the prediction score is lowered. Furthermore, as illustrated in FIG. 15(c), as the deposition thickness t of the deposited spatter 31b is increased, the state of the skid 10 is further away from the reference state, and therefore the prediction score is lowered.

The defect prediction unit may evaluate the state of the skids 10 by looking at the prediction score for each of the above items to be checked individually, or may evaluate the state of the skids 10 by comprehensively determining the prediction scores of these items. These prediction scores are displayed on, for example, the display of the display device as needed. Consequently, for example, the user can determine the state of the skids 10 based on a situation at the actual processing site while considering the prediction score displayed on the display of the display device.

As described above, according to this embodiment, in at least two stages before carrying in of the laser processing machine 1 and after carrying out from the laser processing machine 1, the state of the skids 10 is determined using the inspection image of the skid table 11 imaged from the oblique direction, and therefore it is possible to determine the state of the skids 10 in a short span, and determine the occurrence of defects due to the state of the skids 10 with high accuracy.

The embodiment of the present invention is described as described above, but this embodiment is presented as an example and is not intended to limit the scope of the invention. This novel embodiment can be implemented in various other forms, and various omissions, substitutions, and changes can be made without departing from the summary of the invention. These embodiments and modifications thereof are included in the scope and summary of the invention, and are included in the invention described in the scope of the claims and the equivalents.

[Remarks]

In this specification, for example, the following items are described.

[Item 1]

A skid state determination device for determining a state of a plurality of skids for supporting a workpiece to be processed by a laser processing machine, with a supporting surface formed by top points of a plurality of protrusions, the skid state determination device including:

imaging means configured to be able to image at least a part of a skid table provided with the plurality of skids; and state determination means configured to determine the state of the skids based on image information obtained by imaging the skid table with the imaging means, wherein the state determination means executes:

first determination processing for determining the state of the skids based on the image information obtained by imaging the skid table with the imaging means, before the workpiece is carried onto the skid table; and second determination processing for determining the state of the skids based on the image information obtained by imaging the skid table with the imaging means, after the workpiece is carried out from the laser processing machine but before a product obtained by processing the workpiece is carried out from the skid table.

[Item 2]

The skid state determination device described in item 1, wherein the imaging means is configured to image the skid table from a position above the supporting surface formed by the top points of the plurality of protrusions formed on the plurality of skids and output first image information, before the workpiece is carried onto the skid table, and is configured to image the skid table from a position below the supporting surface and output second image information, in a state in which a processed workpiece is supported by the skid table.

[Item 3]

The skid state determination device described in item 1 or 2, further including a backlight source configured to irradiate the skid table with a beam from a direction different from an imaging direction of the imaging means.

[Item 4]

The skid state determination device described in any one of items 1 to 3, wherein the state determination means is configured to store a reference image, compare an image in the image information and the reference image, and determine the state of the skids.

[Item 5]

The skid state determination device described in any one of items 1 to 3, wherein the state determination means is configured to extract outlines including the plurality of protrusions of the skids from the image information, compare the extracted outlines with a reference shape previously stored, and determine the state of the skids.

[Item 6]

The skid state determination device described in any one of items 1 to 3, wherein the state determination means is configured to extract outlines including the plurality of protrusions of the skids from the image information, determine pass lines connecting the top points of the plurality of protrusions, and determine the state of the skids based on the pass lines and the outlines.

[Item 7]

The skid state determination device described in item 6, wherein the state determination means is configured to determine the state of the skids based on distances in the height directions of the skids between valley portions appearing around the protrusions of the outlines and the pass lines.

[Item 8]

The skid state determination device described in item 6, wherein the state determination means is configured to determine the state of the skids based on areas of regions surrounded by the outlines and the pass lines.

[Item 9]

The skid state determination device described in item 5, wherein the state determination means is configured to determine the state of the skids based on thicknesses of the skids based on the outlines.

[Item 10]

The skid state determination device described in any one of items 1 to 9, further including notification means configured to notify a predetermined warning or alarm based on a determination result by the state determination means.

[Item 11]

The skid state determination device described in item 10, wherein the state determination means further includes:

a learning unit having a learning model generated by learning relation between a plurality of pieces of the image information, and the state of the skids classified into a plurality of groups; and defect prediction means configured to determine the state of the skids based on the learning model, and determines necessity of a warning or an alarm, and a type of the warning or the alarm, as well as whether or not processing is to be continued, in accordance with the state of the skids, and the notification means has display means configured to visually display the warning or the alarm based on the determination result by the defect prediction means.

[Item 12]

A laser processing system including:

a laser processing machine configured to process a workpiece with a laser beam;

a skid table provided with a plurality of skids for supporting the workpiece with a supporting surface formed by top points of a plurality of protrusions;

a processing pallet configured to be carried into and out from the laser processing machine together with the skid table and the workpiece;

an imaging device configured to be able to image at least a part of the skid table on the processing pallet at a position of the processing pallet immediately before the processing pallet is carried into the laser processing machine and immediately after the processing pallet is carried out from the laser processing machine; and a state determination device configured to determine a state of the skids based on image information obtained by imaging the skid table with the imaging device, wherein the state determination device executes:

first determination processing for determining the state of the skids based on the image information obtained by imaging the skid table with the imaging device, before the workpiece is carried onto the skid table; and second determination processing for determining the state of the skids based on the image information obtained by imaging the skid table with the imaging device, after the processing pallet is carried out from the laser processing machine but before a product obtained by processing the workpiece is carried out from the skid table.

[Item 13]

The laser processing system described in item 12, wherein the imaging device is configured to image the skid table from a position above the supporting surface formed by the top points of the plurality of protrusions formed on the plurality of skids and output first image information, before the workpiece is carried onto the skid table, and is configured to image the skid table from a position below the supporting surface and output second image information, in a state in which a processed workpiece is supported by the skid table.

[Item 14]

The laser processing system described in item 12 or 13, further including a backlight source configured to irradiate the skid table with a beam from a direction different from an imaging direction of the imaging device.

[Item 15]

The laser processing system described in any one of items 12 to 14, wherein the state determination device is configured to store a reference image, compare an image in the image information and the reference image, and determine the state of the skids.

[Item 16]

The laser processing system described in any one of items 12 to 14, wherein the state determination device is configured to extract outlines including the plurality of protrusions of the skids from the image information, compare the extracted outlines with a reference shape previously stored, and determine the state of the skids.

[Item 17]

The laser processing system described in any one of items 12 to 14, wherein the state determination device is configured to extract outlines including the plurality of protrusions of the skids from the image information, determine pass lines connecting the top points of the plurality of protrusions, and determine the state of the skids based on the pass lines and the outlines.

[Item 18]

The laser processing system described in item 17, wherein the state determination device is configured to determine the state of the skids based on distances in the height directions of the skids between valley portions appearing around the protrusions of the outlines and the pass lines.

[Item 19]

The laser processing system described in item 17, wherein the state determination device is configured to determine the state of the skids based on areas of regions surrounded by the outlines and the pass lines.

[Item 20]

The laser processing system described in item 16, wherein the state determination device is configured to determine the state of the skids based on thicknesses of the skids based on the outlines.

[Item 21]

The laser processing system described in any one of items 12 to 20, further including a notification device configured to notify a predetermined warning or alarm based on a determination result by the state determination device.

[Item 22]

The laser processing system described in item 21, wherein the state determination device further includes:

a learning unit having a learning model generated by learning relation between a plurality of pieces of the image information, and the state of the skids classified into a plurality of groups; and a defect prediction device configured to determine the state of the skids based on the learning model, and determines necessity of a warning or an alarm, and a type of the warning or the alarm, as well as whether or not processing is to be continued, in accordance with the state of the skids, and the notification device has a display unit configured to visually display the warning or the alarm based on the determination result by the defect prediction device.

[Item 23]

The laser processing system described in item 22, wherein the learning unit is configured to generate the learning model by performing at least one of: learning processing using a plurality of pieces of image information of deposited spatters deposited between the protrusions of the skids, distances from the pass lines connecting the top points of the plurality of protrusions in the respective pieces of image information to valley portions appearing between the protrusions, and/or areas of background regions of the skids, as a learning sample; learning processing using a plurality of pieces of image information including deposited spatters deposited on wall surfaces of the skids, and thicknesses of the deposited spatters, as a learning sample; learning processing using a plurality of pieces of image information including skid deposits adhered to the skids, areas of the skid deposits, as a learning sample; learning processing using image information of a plurality of the skids with loss, and a loss ratio of each of the skids, as a learning sample, and the defect prediction device is configured to input, to the learning model, the image information obtained by imaging the skid table with the imaging device, and display a prediction score indicating the state of the skids.

[Item 24]

A skid state determination method to be executed in a laser processing system including: a laser processing machine configured to process a workpiece with a laser beam; a skid table provided with a plurality of skids for supporting the workpiece with a supporting surface formed by top points of a plurality of protrusions; a processing pallet configured to be carried into and out from the laser processing machine together with the skid table and the workpiece; an imaging device configured to be able to image at least a part of the skid table on the processing pallet at a position of the processing pallet immediately before the processing pallet is carried into the laser processing machine and immediately after the processing pallet is carried out from the laser processing machine; and a state determination device configured to determine a state of the skids based on image information obtained by imaging the skid table with the imaging device, the skid state determination method including:

first determining of determining, by the state determination device, the state of the skids based on the image information obtained by imaging the skid table with the imaging device, before the workpiece is carried onto the skid table; and second determining of determining, by the state determination device, the state of the skids based on the image information obtained by imaging the skid table with the imaging device, after the processing pallet is carried out from the laser processing machine but before a product obtained by processing the workpiece is carried out from the skid table.

The invention claimed is:

1. A skid state determination device for determining a state of a plurality of skids for supporting a workpiece to be processed by a laser processing machine, with a supporting surface formed by top points of a plurality of protrusions, the skid state determination device comprising:

imaging means configured to be able to image at least a part of a skid table provided with the plurality of skids; and state determination means configured to determine the state of the skids based on image information obtained by imaging the skid table with the imaging means, wherein the imaging means is configured to:

image the skid table from a position above the supporting surface defined by the top points of the plurality of protrusions formed on the plurality of skids, and output first image information;

image the skid table from a position below the supporting surface, and output second image information; and image the skid table from above in a vertical direction or from a longitudinal direction of the skid, and output third image information, the state determination means executes:

first determination processing for determining the state of the skids based on the first image information obtained by imaging the skid table with the imaging means second determination processing for determining the state of the skids based on the second image information obtained by imaging the skid table with the imaging means; and third determination processing for determining a state of spatters deposited on a wall surface of each skid based on the third image information acquired by imaging the skid table with the imaging means.

2. The skid state determination device according to claim 1, further comprising a backlight source configured to irradiate the skid table with a beam from a direction different from an imaging direction of the imaging means.

3. The skid state determination device according to claim 1, wherein the state determination means is configured to store a reference image, compare an image in the image information and the reference image, and determine the state of the skids.

4. The skid state determination device according to claim 1, wherein the state determination means is configured to extract outlines including the plurality of protrusions of the skids from the image information, compare the extracted outlines with a reference shape previously stored, and determine the state of the skids.

5. The skid state determination device according to claim 1, wherein the state determination means is configured to extract outlines including the plurality of protrusions of the skids from the image information, determine pass lines connecting the top points of the plurality of protrusions, and determine the state of the skids based on the pass lines and the outlines.

6. The skid state determination device according to claim 1, further comprising notification means configured to notify a predetermined warning or alarm based on a determination result by the state determination means.

7. A laser processing system comprising:

a laser processing machine configured to process a workpiece with a laser beam;

a skid table provided with a plurality of skids for supporting the workpiece with a supporting surface formed by top points of a plurality of protrusions;

a processing pallet configured to be carried into and out from the laser processing machine together with the skid table and the workpiece;

an imaging device configured to be able to image at least a part of the skid table on the processing pallet at a position of the processing pallet immediately before the processing pallet is carried into the laser processing machine and immediately after the processing pallet is carried out from the laser processing machine; and a state determination device configured to determine a state of the skids based on image information obtained by imaging the skid table with the imaging device, wherein the imaging device is configured to:

image the skid table from a position above the supporting surface defined by the top points of the plurality of protrusions formed on the plurality of skids, and output first image information;

image the skid table from a position below the supporting surface, and output second image information; and image the skid table from above in a vertical direction or from a longitudinal direction of the skid, and output third image information, the state determination device executes:

first determination processing for determining the state of the skids based on the first image information obtained by imaging the skid table with the imaging device;

second determination processing for determining the state of the skids based on the second image information obtained by imaging the skid table with the imaging device; and third determination processing for determining a state of spatters deposited on a wall surface of each skid based on the third image information acquired by imaging the skid table with the imaging device.

8. The laser processing system according to claim 7, further comprising a backlight source configured to irradiate the skid table with a beam from a direction different from an imaging direction of the imaging device.

9. The laser processing system according to claim 7, wherein the state determination device is configured to store a reference image, compare an image in the image information and the reference image, and determine the state of the skids.

10. The laser processing system according to claim 7, wherein the state determination device is configured to extract outlines including the plurality of protrusions of the skids from the image information, compare the extracted outlines with a reference shape previously stored, and determine the state of the skids.

11. The laser processing system according to claim 7, wherein the state determination device is configured to extract outlines including the plurality of protrusions of the skids from the image information, determine pass lines connecting the top points of the plurality of protrusions, and determine the state of the skids based on the pass lines and the outlines.

12. The laser processing system according to claim 7, further comprising a notification device configured to notify a predetermined warning or alarm based on a determination result by the state determination device.

13. A skid state determination method to be executed in a laser processing system including: a laser processing machine configured to process a workpiece with a laser beam; a skid table provided with a plurality of skids for supporting the workpiece with a supporting surface formed by top points of a plurality of protrusions; a processing pallet configured to be carried into and out from the laser processing machine together with the skid table and the workpiece; an imaging device configured to be able to image at least a part of the skid table on the processing pallet at a position of the processing pallet immediately before the processing pallet is carried into the laser processing machine and immediately after the processing pallet is carried out from the laser processing machine; and a state determination device configured to determine a state of the skids based on image information obtained by imaging the skid table with the imaging device, the skid state determination method comprising:

first determining of determining, by the state determination device, the state of the skids based on the image information obtained by imaging the skid table with the imaging device, before the workpiece is carried onto the skid table; and second determining of determining, by the state determination device, the state of the skids based on the image information obtained by imaging the skid table with the imaging device, after the processing pallet is carried out from the laser processing machine but before a product obtained by processing the workpiece is carried out from the skid table.

* * * * *